(12) United States Patent
Soto

(10) Patent No.: US 8,417,287 B2
(45) Date of Patent: Apr. 9, 2013

(54) VIRTUAL GATEWAY NODE FOR DUAL-MODE WIRELESS PHONES

(75) Inventor: Walter G. Soto, San Clemente, CA (US)

(73) Assignee: Agere Systems LLC, Allentown, PA (US)

( * ) Notice: Subject to any disclaimer, the term of this patent is extended or adjusted under 35 U.S.C. 154(b) by 0 days.

(21) Appl. No.: 13/308,807

(22) Filed: Dec. 1, 2011

(65) Prior Publication Data

US 2012/0069765 A1    Mar. 22, 2012

Related U.S. Application Data

(62) Division of application No. 11/750,645, filed on May 18, 2007, now Pat. No. 8,090, 401.

(60) Provisional application No. 60/802,035, filed on May 19, 2006.

(51) Int. Cl.
*H04M 1/00* (2006.01)

(52) U.S. Cl.
USPC ........ 455/553.1; 455/436; 455/443; 455/444; 455/41.1; 455/41.2; 370/338; 370/331; 370/332; 370/333; 370/334

(58) Field of Classification Search .......... 455/436–444, 455/41.1, 41.2, 552.1, 553.1; 370/338, 331–334
See application file for complete search history.

(56) References Cited

U.S. PATENT DOCUMENTS

| | | | |
|---|---|---|---|
| 5,003,589 A | 3/1991 | Chen | |
| 5,267,261 A | * 11/1993 | Blakeney et al. | ............. 370/332 |
| 5,675,629 A | 10/1997 | Raffel et al. | |
| 5,697,062 A | 12/1997 | Hendrickson | |
| 5,913,163 A | 6/1999 | Johansson | |
| 5,978,689 A | 11/1999 | Tuoriniemi et al. | |
| 6,006,115 A | 12/1999 | Wingate | |
| 6,078,825 A | 6/2000 | Hahn et al. | |

(Continued)

FOREIGN PATENT DOCUMENTS

WO    WO01/48977 A2    7/2001

OTHER PUBLICATIONS

Non-Final Office Action; Mailed on Jan. 27, 2010 for the corresponding U.S. Appl. No. 11/750,645.

(Continued)

*Primary Examiner* — Jinsong Hu
*Assistant Examiner* — Michael Nguyen
(74) *Attorney, Agent, or Firm* — Mendelsohn, Drucker & Associates, P.C.; Edward J. Meisarosh; Steve Mendelsohn

(57) ABSTRACT

In one embodiment, a virtual gateway mediates between a dual-mode subscriber device and an IP-based PBX. In particular, the virtual gateway includes a WLAN interface for communicating with the dual-mode subscriber device and a network interface (wired or wireless) for communicating with the IP-based PBX over the Internet. As such, the virtual gateway may relay voice and call control instructions between the dual-mode subscriber device and the IP-based PBX, and may provide the same call control functions to the dual-mode subscriber device provided by the call control processor in existing dual-mode phones. The embodiment further provides a dual-mode subscriber device suitable for operation with the virtual gateway. Because the dual-mode subscriber device does not require a call control processor, the battery life and cost of the device are significantly improved.

20 Claims, 19 Drawing Sheets

U.S. PATENT DOCUMENTS

| | | | |
|---|---|---|---|
| 6,134,437 | A | 10/2000 | Karabinis et al. |
| 6,208,876 | B1 | 3/2001 | Raussi et al. |
| 6,339,706 | B1 | 1/2002 | Tillgren et al. |
| 6,405,027 | B1 | 6/2002 | Bell |
| 6,535,498 | B1 | 3/2003 | Larsson et al. |
| 6,600,902 | B1 | 7/2003 | Bell |
| 6,614,350 | B1 | 9/2003 | Lunsford et al. |
| 6,647,426 | B2 | 11/2003 | Mohammed |
| 6,697,638 | B1 | 2/2004 | Larsson et al. |
| 6,804,532 | B1 | 10/2004 | Moon et al. |
| 7,050,558 | B1 | 5/2006 | Pershan et al. |
| 7,171,221 | B1 | 1/2007 | Amin et al. |
| 7,502,615 | B2 | 3/2009 | Wilhoite et al. |
| 2002/0028674 | A1 | 3/2002 | Slettengren et al. |
| 2002/0035699 | A1 | 3/2002 | Crosbie |
| 2002/0147008 | A1 | 10/2002 | Kallio |
| 2003/0026240 | A1 | 2/2003 | Eyuboglu et al. |
| 2004/0072593 | A1* | 4/2004 | Robbins et al. ............... 455/560 |
| 2004/0264410 | A1* | 12/2004 | Sagi et al. .................... 370/331 |
| 2004/0266426 | A1 | 12/2004 | Marsh et al. |
| 2006/0045056 | A1 | 3/2006 | O'Hara, Jr. |
| 2006/0072542 | A1 | 4/2006 | Sinnreich et al. |
| 2006/0116127 | A1 | 6/2006 | Wilhoite et al. |
| 2006/0121916 | A1 | 6/2006 | Aborn et al. |
| 2006/0126565 | A1 | 6/2006 | Shaheen |
| 2006/0205436 | A1 | 9/2006 | Liu et al. |
| 2006/0246903 | A1 | 11/2006 | Kong et al. |
| 2007/0002844 | A1* | 1/2007 | Ali ............................... 370/352 |
| 2007/0008928 | A1 | 1/2007 | Kezys |
| 2007/0049274 | A1 | 3/2007 | Yacobi et al. |
| 2007/0049276 | A1 | 3/2007 | Rimoni et al. |
| 2007/0049329 | A1* | 3/2007 | Mayer et al. ............... 455/552.1 |
| 2007/0070948 | A1 | 3/2007 | Kezys et al. |
| 2007/0207804 | A1 | 9/2007 | Sharma et al. |

OTHER PUBLICATIONS

Final Rejection; Mailed on Aug. 3, 2010 for the corresponding U.S. Appl. No. 11/750,645.

Non-Final Office Action; Mailed on Nov. 10, 2010 for the corresponding U.S. Appl. No. 11/750,645.

Final Rejection; Mailed on Apr. 13, 2011 for the corresponding U.S. Appl. No. 11/750,645.

Notice of Allowance; Mailed on Sep. 1, 2011 for the corresponding U.S. Appl. No. 11/750,645.

* cited by examiner

VIRTUAL GATEWAY NODE FOR DUAL-MODE WIRELESS PHONES

This application is a divisional of U.S. patent application Ser. No. 11/750,645, filed on May 18, 2007, which claims the priority of provisional patent application No. 60/802,035, filed on May 19, 2006. Both applications are hereby incorporated by reference in their entirety.

BACKGROUND

1. Description of the Related Art

The present invention relates to mobile communication via multiple wireless communication networks.

2. Description of the Related Art

In recent years, wireless networking systems have been developed that are capable of carrying local area Internet Protocol (IP) services, such as voice over IP (VoIP). For example, the 802.11b standard promulgated by the IEEE is a common standard that defines many aspects of networks that provide in-building wireless IP-based coverage. A single 802.11b access point provides a coverage area of about 100 meters in diameter. By networking these access points together in a grid, seamless coverage can be provided over a localized area to create a wireless local area network (WLAN).

Several companies have also developed wireless handsets that can be used to carry wireless voice traffic over such systems. For example, some handsets provide VoIP communications over 802.11b LAN installations using the ITU standard H.323. These handsets convert analog voice into compressed digital packets that are sent via the TCP/IP protocol over standard data networks.

FIG. 1 shows a network incorporating wireless voice over IP capabilities. A VoIP wireless phone 100 communicates encoded IP packets to one of the WLAN access points 102A-102N. The WLAN access points 102A-102N provide the physical footprint of the WLAN and pass the IP packets to and from a private branch exchange (PBX) telephone switch 104. If the PBX switch 104 is an IP-based device, it will directly accept the IP packets. If the PBX switch 104 is a legacy machine, a VoIP gateway (not shown) can be used to interface the access points 102A-102N to the PBX switch 104. The PBX switch 104 provides call control and routing functions. The PBX switch 104 can route calls either to a public switched telephone network (PSTN) 106 or over an IP backbone 108. Such systems also typically include a wired local area network 110 that provides service to wired desktop phones such as a desk phone 112. The wired local area network 110 may be IP-based, a legacy system or a combination of these.

If the PBX switch 104 is a part of an IP-based phone system, the PBX SWITCH 104 may use control signals, such as session initiation protocol (SIP), to provide call control processing. SIP defines the protocol mechanism necessary to provide call establishment, call forwarding, caller and called number delivery (often used to provide caller ID), remote unit capability negotiation, caller and called party authentication, caller and called device authentication, call transfer, conference calling and other calling features. However, other signaling mechanisms can also be used such as Skinny Station Protocol, which is Cisco's proprietary implementation of the H.323 IP telephony model. Using such a system, the wireless phone 100 can provide some of the same features available in the desktop phone 112 as the user wanders throughout the coverage area of the WLAN.

Unfortunately, once the user exits the coverage area of the WLAN, his wireless phone 100 is no longer capable of receiving WLAN calls. Rather than requiring a user to carry both a VoIP wireless phone for calls inside the WLAN coverage area and a cellular (e.g., GSM) phone for calls outside the WLAN coverage area, various manufacturers have proposed a dual-mode subscriber device capable of operating over both a WLAN and the cellular network. Such a device includes both a GSM chip set and a WLAN voice-over-IP chip set. Unfortunately, however, such a device also requires a dedicated call control processor (e.g., a SIP OR H.323 processor). This dedicated call control processor adds to the cost, size and complexity of the dual-mode subscriber device.

SUMMARY OF THE INVENTION

Briefly described, the present invention provides a virtual gateway that mediates between an dual-mode subscriber device and an IP-based telephone switch (a.k.a., "soft switch" or "voice gateway). In particular, the virtual gateway includes a WLAN interface for communicating with the dual-mode subscriber device and a network interface (wired or wireless) for communicating with the IP-based telephone switch over the Internet. As such, the virtual gateway may relay voice and call control instructions between the dual-mode subscriber device and the IP-based telephone switch, and may provide the same call control functions to the dual-mode subscriber device provided by the call control processor in existing dual-mode phones. Accordingly, the call control processor is no longer needed in the present dual-mode subscriber device, and the battery life and cost of phone are thereby improved.

The various aspects of the invention will now be described in more detail. It should be understood that the systems and methods of the invention have several features, no single one of which is solely responsible for its attributes. Without limiting the scope of the invention as expressed by the claims that follow, its more prominent features will now be discussed briefly. After considering this discussion, and particularly after reading the section entitled "Detailed Description," one will understand how the features of the system and methods provide several advantages over traditional communication systems.

One aspect of the invention is a virtual gateway for communicating voice and call control data between an IP-based telephone switch connected via a wired or wireless communication link and a remote unit connected via a WLAN link. The virtual gateway comprises a portable computing device, including a wireless local area network interface capable of establishing a WLAN link with the dual-mode subscriber device, a network interface capable of establishing a wired or wireless communication link with the IP-based telephone switch, and a processor configured to relay voice and call control data between the dual-mode subscriber device and the IP-based telephone switch. Further, the call control data transmitted over the communication link are in a first control signaling format (e.g., a SIP or H.323 format) and the call control data transmitted over the WLAN link are in a second control signaling format different than the first.

Another aspect of the invention is a method for communicating voice and call control data between an IP-based telephone switch and a dual-mode subscriber device capable of operation within a wireless communication system. The method comprises the steps of establishing a WLAN link with the dual-mode subscriber device; establishing a communication link with the IP-based telephone switch; and relaying voice and call control data between the dual-mode subscriber device and the IP-based telephone switch. Further, the call control data transmitted over the communication link are in a first control signaling format (e.g., a SIP or H.323 format) and the call control data transmitted over the WLAN link are in a second control signaling format different than the first.

Still another aspect of the invention is dual-mode wireless communication device suitable for operation in a WLAN-based system including a wireless local area network, a virtual gateway and an IP-based telephone switch as well as in a wireless communication system. The dual-mode wireless communication device comprises a VoIP processing module configured to establish a WLAN-based call with the IP-based telephone switch via the virtual gateway; a cellular processing module configured to establish a PSTN call with the wireless communication system; and a controller module configured to switch between the WLAN-based call with the IP-based telephone switch via the virtual gateway and the PSTN call with the wireless communication system.

Still another aspect of the invention is a method of establishing a telephone connection at a dual-mode wireless communication device suitable for operation in a WLAN-based system including a wireless local area network, a virtual gateway and an IP-based telephone switch as well as in a wireless communication system. This method comprises the steps of establishing a WLAN-based call with the IP-based telephone switch via the virtual gateway; establishing a cellular-based call with the wireless communication system; and switching between the WLAN-based call established with the IP-based telephone switch via the virtual gateway and the cellular-based call with the wireless communication system.

BRIEF DESCRIPTION OF THE DRAWINGS

Throughout these figures, like reference numbers are used to designate like elements.

DETAILED DESCRIPTION

Figure 1:
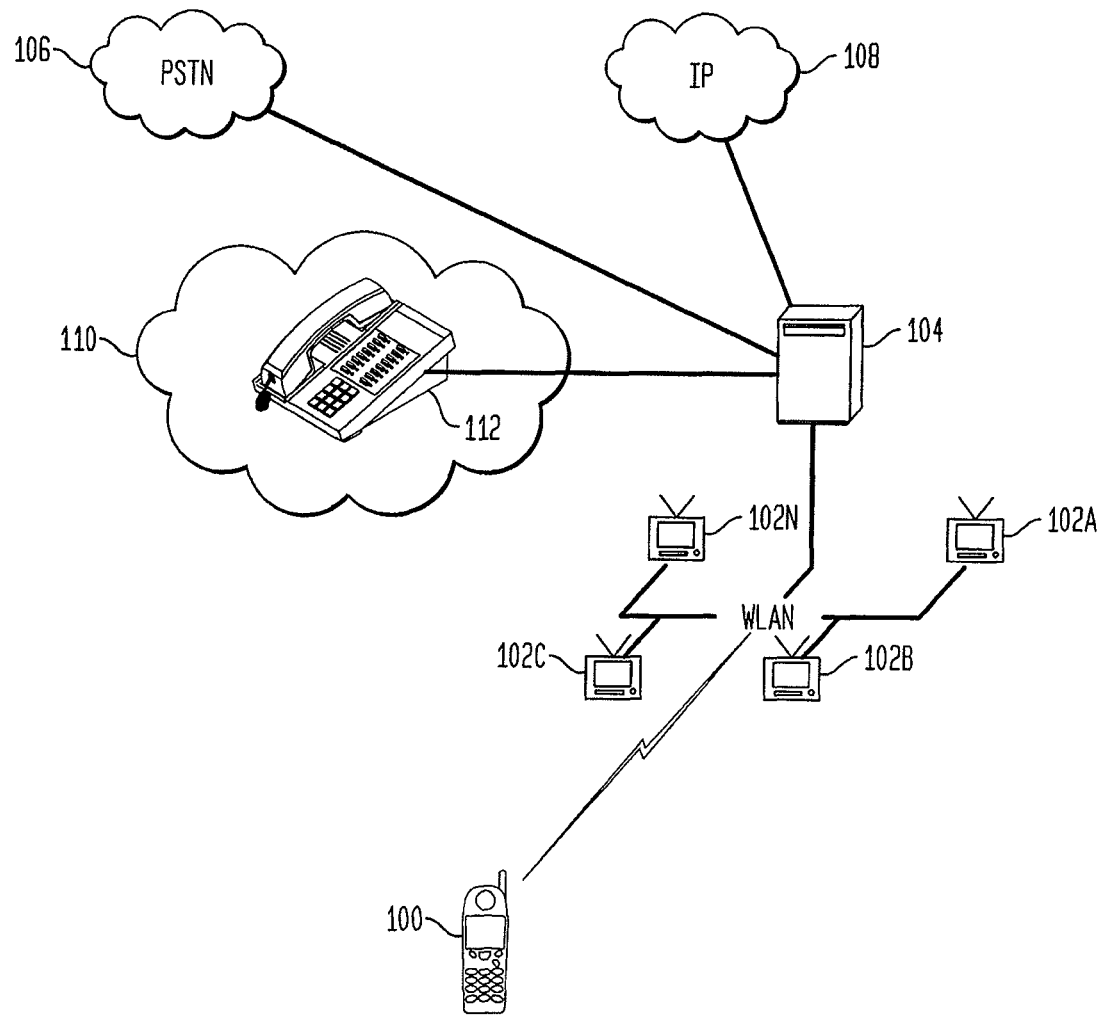
FIG. 1 is a network diagram showing a network embodiment incorporating wireless voice over IP capabilities.
Figure 2:
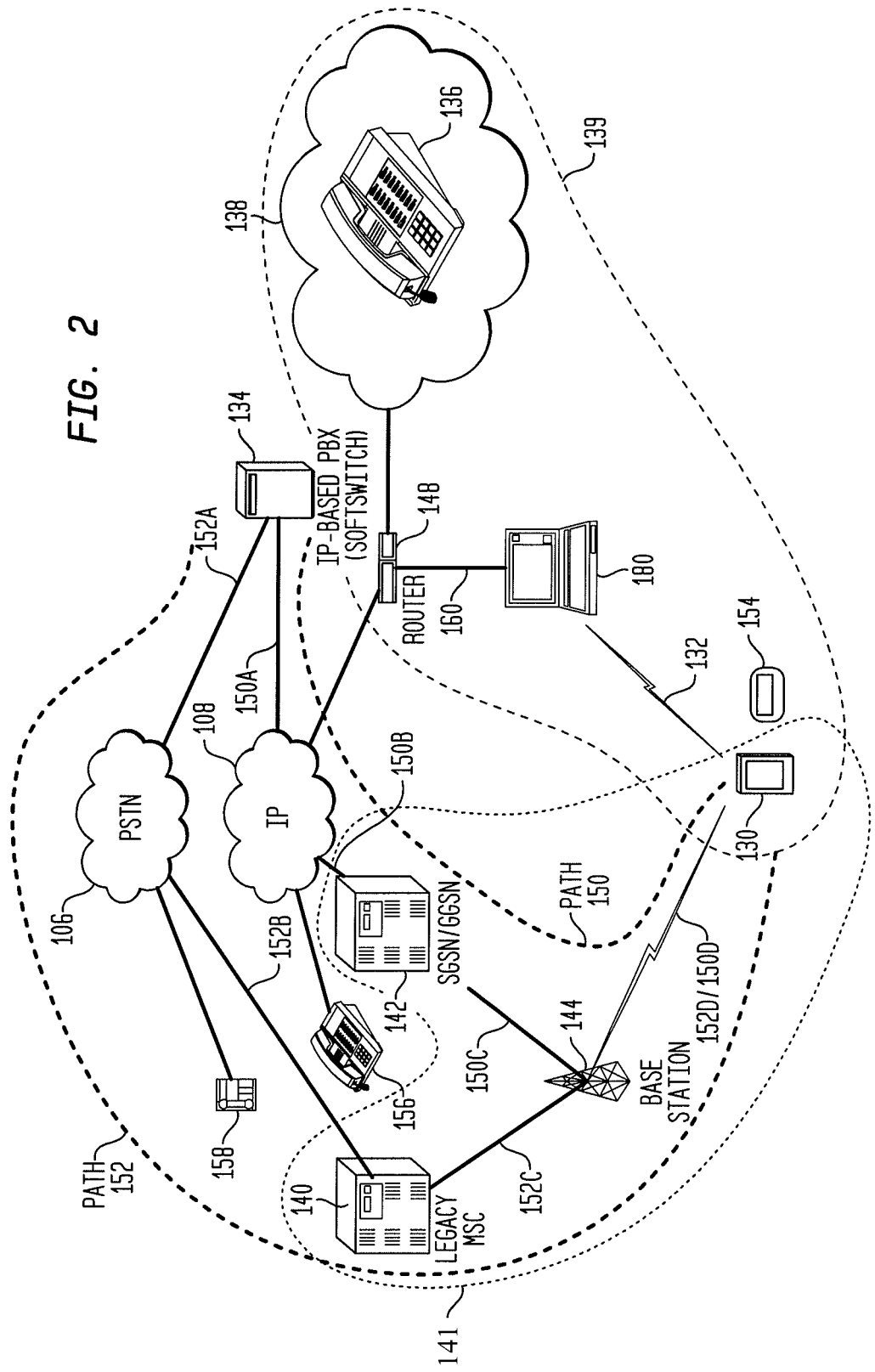
FIG. 2 is a network diagram showing a network embodiment with SIP features in a cellular system.

FIG. 2 is a network diagram depicting an embodiment of the present invention. In accordance with the invention, a remote unit (e.g., dual-mode subscriber device 130) is provided that is capable of both cellular voice communication and wireless networking.

Further, a virtual gateway node (VGN 180) 162 is provided for communicating with the remote unit via a wireless network link (hereinafter, WLAN) 132 and for serving as an access point by which the remote unit may access the Internet and other communications networks. The VGN 180 preferably provides a SIP or H.323 processor function for creating and receiving SIP or H.323 messaging (e.g., to terminate SIP, SDP and/or RTP protocols) on behalf of the subscriber device 130. The VGN 180 is preferably a laptop computer or other mobile computing device having a WLAN interface card for establishing a VoWLAN session with the subscriber device 130.

The WLAN 132 is preferably an IP-based wireless link. In the example that follows, the WLAN 132 is an 802.11b compatible interface. However, other IP-based wireless interfaces may be used. For example, suitable wireless local area network standards include 802.11a, 802.11g, HomeRF, Bluetooth, and HiperLAN.

VGN 180 further includes a network interface (either wired or wireless) for connecting to a local network 139. Local network 139 may include a router 148 coupled to a conventional local area network (LAN) 138. LAN 138 may include other personal computers or any other IP-enabled devices, such as an IP-enabled desk phone 136 or an IP-based PBX.

Local network 139 is further connected via router 148 to an IP backbone 108 and to an IP-based telephone switch (a.k.a., "soft switch" or "voice gateway") 134. The soft switch 134 is in turn coupled to the PSTN 106. The soft switch 134 can provide VoIP services (including, e.g., SIP or H.323 proxy services) to VGN 180 and to other IP devices connected to the wired local area network 138, including, for example, the IP desk phone 136. The soft switch 134 preferably also is capable of providing PBX services to authorized IP-based communication devices such as the IP desk phone 136.

FIG. 2 further depicts one or more wide area networks, represented by cellular network 141. The wide area network is referred to as a cellular network and, more specifically, can be a Global System for Mobile Communications (GSM) system that incorporates General Packet Radio Service (GPRS). However, other wide area networks can be used. For example, CDMA cellular networks with IP data communication capability (such as, for example, CDMA 1xRTT), I-Mode IP-based service from DoCoMo of Japan as well as voice service over their Personal HandyPhone System and Nextel's voice and data services over a Motorola IDEN system can be used.

The cellular network 141 includes one or more legacy mobile switching centers (MSC) 140 that control the cellular network 141 and provide a connection to the PSTN 108. One or more base stations are represented by base station 144 that transmits and receives the wireless cellular communication signals to user devices. The base station is linked to the MSC 140 by a leg 152C. The IP backbone 108 is coupled to the cellular network 141 by a gateway GPRS support node (GGSN) and in turn to a serving GPRS support node (SGSN), which are represented as a combined SGSN/GGSN 142 in FIG. 2. One feature of the system shown in FIG. 2 is that, in one embodiment, it can operate without demanding any changes to the cellular infrastructure. Thus, the MSC 140 and the SGSN/GGSN 142 operate in the standard manner well known in the art. As such, in addition to other functions, the SGSN/GGSN 142 serves as a gateway between a group of cellular base stations 144 and the IP backbone 108.

The remote unit shown in FIG. 2 is preferably a dual-mode subscriber device 130. The subscriber device 130 is enabled to communicate with the VGN 180 over the WLAN 132 and with the wide area cellular network 141. When the dual-mode subscriber device 130 is within the coverage area of the WLAN 132, the dual-mode subscriber device 130 communicates VoWLAN packets to and from the VGN 180 via WLAN 132. The dual-mode subscriber device 130 is described in more detail below in connection with FIGS. 8 and 9. In an alternative embodiment, the remote unit may be a single-mode WLAN-enabled subscriber device capable of communication only with the VGN 180, not with the wide area cellular network 141.

When the dual-mode subscriber device 130 is within the coverage area of the WLAN 132, incoming calls can be routed to and from the dual-mode subscriber device 130 via the VGN 180 and the WLAN 132. For example, the soft switch 134, working in conjunction with the SIP or H.323-enabled VGN 180, can switch an incoming VoIP call from a VoIP phone 156 through the VGN 180 to the dual-mode subscriber device 130. In addition, the soft switch 134 is also coupled to the PSTN 106 and acts as a VoIP gateway for the legacy PSTN voice format call (typically pulse code modulated (PCM)), such as from a legacy phone 158, so as to switch the call in a VoIP format via the VGN 180 to the dual-mode subscriber device 130.

When the dual-mode subscriber device 130 leaves the coverage area of the WLAN 132, the dual-mode subscriber device 130 begins to communicate under the control of the soft switch 134 and the VGN 180 using a wide area cellular network such as a GPRS-enabled GSM system. The connection between the soft switch 134 and the dual-mode subscriber device 130 through the cellular network can be formed by two types of bi-directional paths. The path 150A-D is a standard cellular data path. The path 152A-D is a standard cellular voice path. Both of these paths 150 and 152 are made up a series of legs.

The soft switch 134 is coupled to the IP backbone 108 by the leg 150A. In turn, the IP backbone 108 is coupled to a gateway GPRS support node and in turn to a serving GPRS support node (SGSN/GGSN) 142 by the leg 150B. One feature of the system shown in FIG. 2 is that it can operate with the existing cellular infrastructure, in the standard manner well known in the art. The SGSN/GGSN 142 is coupled to the base station 144 by the leg 150C. The base station 144 is wirelessly coupled to the cellular remote units including dual-mode subscriber device 130 by the leg 150D. Thus, the bi-directional path 150 is a standard cellular data path to a remote unit. The bi-directional path 150 connects the soft switch 134 to the IP backbone 108 by the leg 150A to the SGSN/GGSN 142 by the leg 150B to the base station 144 by the leg 150C and to the dual-mode subscriber device 130 by the leg 150D.

The user may also carry other cellular-enabled data devices. For example, the user may carry a Palm Pilot type device, a BlackBerry type device, a PocketPC type device, pager or the like. In FIG. 2, a data device 154 is also capable of sending and receiving data messaging, such as over the data-bearing path of the cellular system.

The soft switch 134 is also coupled to the PSTN 106 by the leg 152A. In turn, PSTN 106 is coupled to a legacy mobile switching center (MSC) 140 by the leg 152B. As noted above, one feature of the system shown in FIG. 2 is that it can operate without change to the existing cellular infrastructure including the legacy MSC 140, which operates in the standard manner well known in the art. As such, in addition to other functions, the legacy MSC 140 serves as a voice gateway between the group of base stations 144 and PSTN 106. The legacy MSC 140 is coupled to the base station 144 by the leg 152C. The base station 144 communicates wireless voice information with the dual-mode subscriber device 130 over the leg 152D. It should be understood that although on FIG. 2, the leg 150D and the leg 152D are illustrated by a common "lightning bolt" icon, the paths themselves could be different in terms of coding, access techniques, data formats and the like.

In the embodiment shown in FIG. 2, the soft switch 134 can be implemented in a Centrex model whereby a substantial portion of the equipment executing the soft switch function is located off the premise in which service is provided. Centrex models are commonly used in both IP-based and legacy voice systems to provide customers with PBX features. In the IP Centrex model, for calls between two VoIP parties, voice-bearing IP packets are routed on an efficient path between the two parties. Thus, often the voice-bearing traffic stream is not routed through the soft switch 134. The signaling packets related to voice calls within the WLAN 132 and wired local area network 138 (such as VoWLAN and/or SIP or H.323 packets) can be routed through the off-site soft switch 134 via the on-premise router 148 according to well-known mechanisms. Further, in some implementations, the soft switch 134 is distributed and equipment is located in more than one location according to well-known techniques.

In other embodiments, the soft switch function is hosted at a collocation facility, installed at a telephone central office, or integrated more closely with the cellular infrastructure. In yet other embodiments, the soft switch is located on-site at the premise of the coverage area of WLAN. In yet further embodiments, the soft switch functions may be more cellular carrier-focused and implemented, for example, under a carrier-hosted model.

Figure 3:
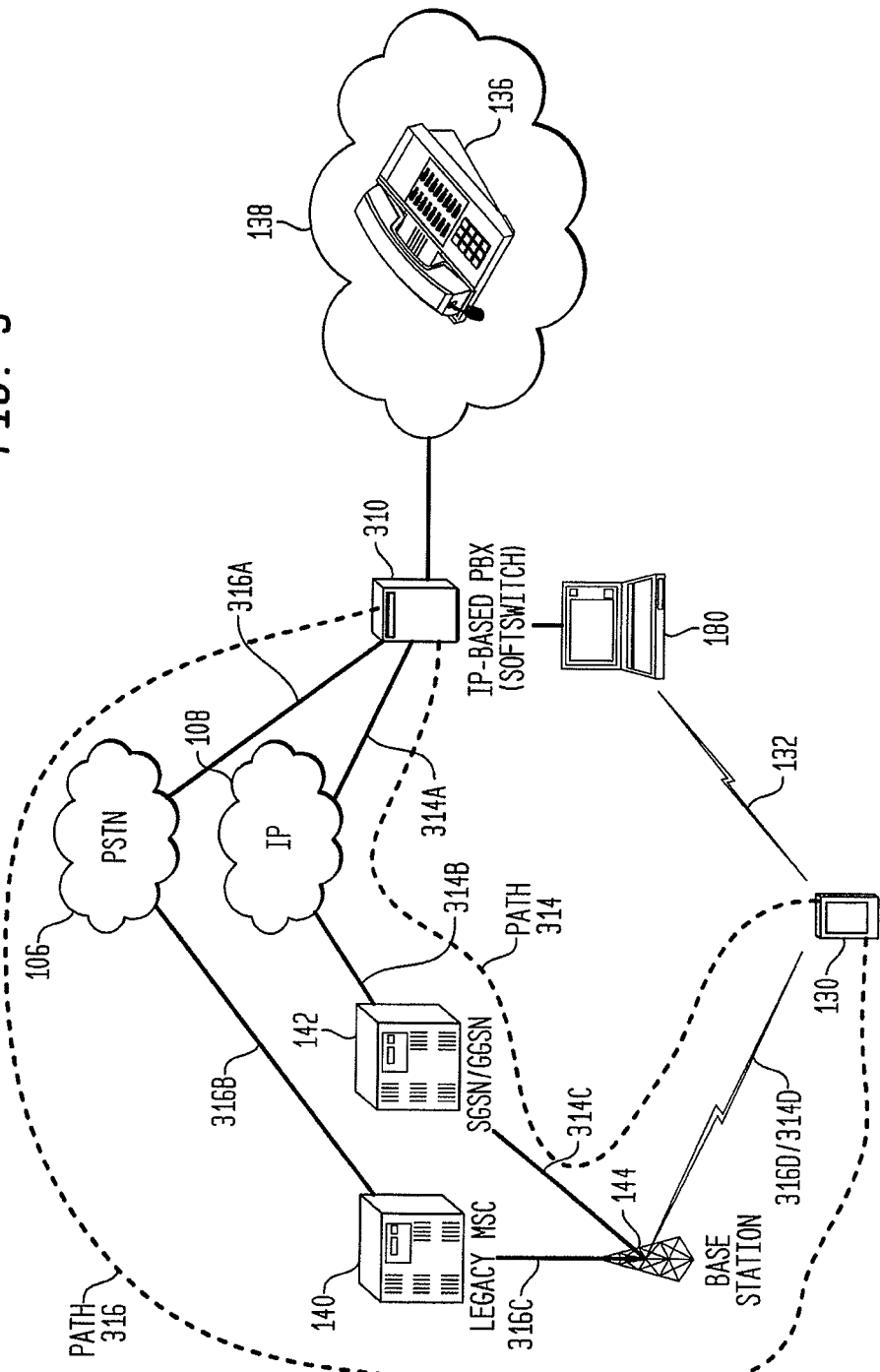
FIG. 3 is a network diagram showing a network embodiment wherein the soft switch is located at the premise of the wireless local area network.

FIG. 3 shows a network operating in an on-site model where the on-site soft switch 310 is located on the premise of the WLAN 132 and the wired local area network 138. According to FIG. 3, a bi-directional path 314A-D is a standard cellular data path from an IP entity to a remote unit: from the soft switch 310 to the IP backbone 108 by a leg 314A to the SGSN/GGSN 142 by a leg 314B to the base station 144 by a leg 314C and to the dual-mode subscriber device 130 by a leg 314D. A bi-directional path 316A-D is a standard cellular voice path from a PSTN entity to a remote unit: from the soft switch 310 to the PSTN 106 by a leg 316A to the legacy MSC 140 by a leg 316B to the base station 144 by a leg 316C and to the dual-mode subscriber device 130 by a leg 316D.

Figure 4:
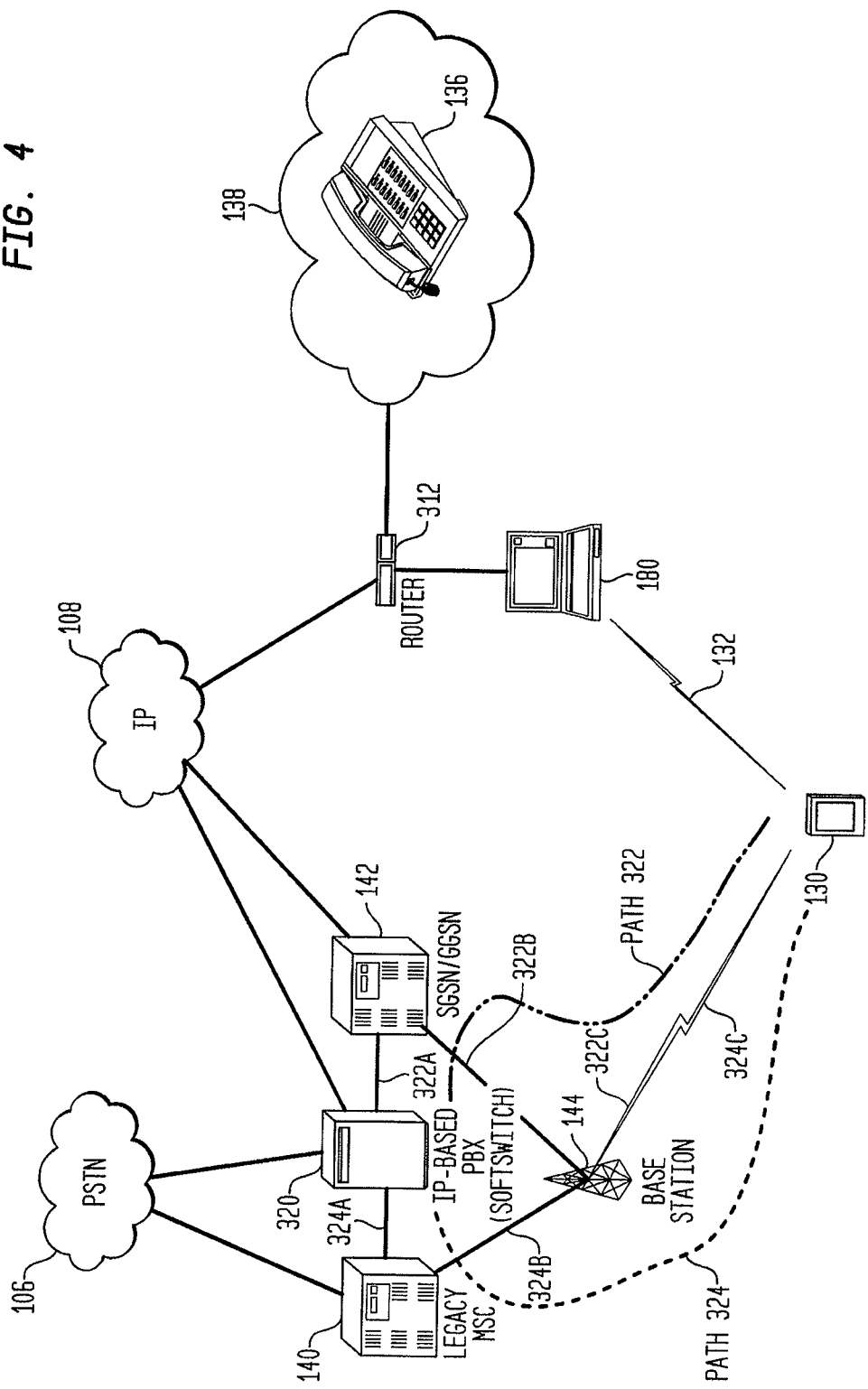
FIG. 4 is a network diagram showing a network embodiment wherein the soft switch is associated with the cellular network equipment.

FIG. 4 shows a network operating in a carrier-hosted model. In FIG. 4, the carrier-hosted soft switch 320 is directly coupled to the SGSN/GGSN 142 by a leg 322A and the legacy MSC 140 by a leg 324A. In this case, a bi-directional path 322 is a standard cellular data path from an IP entity to a remote unit: from the soft switch 320 to the SGSN/GGSN 142 by a leg 322A to the base station 144 by a leg 322B and to the dual-mode subscriber device 130 by a leg 322C. Similarly, bi-directional path 324 is a standard cellular voice path from a PSTN entity to a remote unit: from the soft switch 320 to the legacy MSC 140 by the leg 324A to the base station 144 by a leg 322B and to the dual-mode subscriber device 130 by a leg 324C. The soft switch 320 may be coupled to the SGSN/GGSN 142 over a standard IP connection port in the same manner as IP backbone 108 is coupled to the SGSN/GGSN 142. The soft switch 320 may further be coupled to the legacy MSC 140 over a standard PSTN connection port.

Although the following information refers specifically to FIG. 2, the analogous operations can be directly applied to FIGS. 3 and 4 as well as FIGS. 6 and 18 introduced below. Referring again to FIG. 2, when an incoming call initiation request is received at the soft switch 134 for the dual-mode subscriber device 130 from the PSTN 106, the IP backbone 108 or an internal network, the soft switch 134 switches the incoming call to the dual-mode subscriber device 130. If the dual-mode subscriber device 130 is located within the coverage area of WLAN 132, the soft switch 134 routes the call via the VGN 180 over the WLAN 132 to the dual-mode subscriber device 130. As noted above, the call is comprised of a voice-bearing traffic stream and SIP or H.323 signaling messages. In accordance with the present invention, and as further described below, the VGN 180 handles the SIP or H.323 signaling on behalf of the dual-mode subscriber device 130 and passes the voice-bearing traffic stream to the dual-mode subscriber device 130 over the WLAN 132 according to well-known VoIP/VoWLAN techniques.

If the dual-mode subscriber device 130 is located within the coverage area of the base station 144 and outside the coverage area of the WLAN 132, the soft switch 134 switches the incoming call to the dual-mode subscriber device 130 over one of the bi-directional paths 150 and 152 (depending on their availability) as a standard cellular call.

Figure 5:
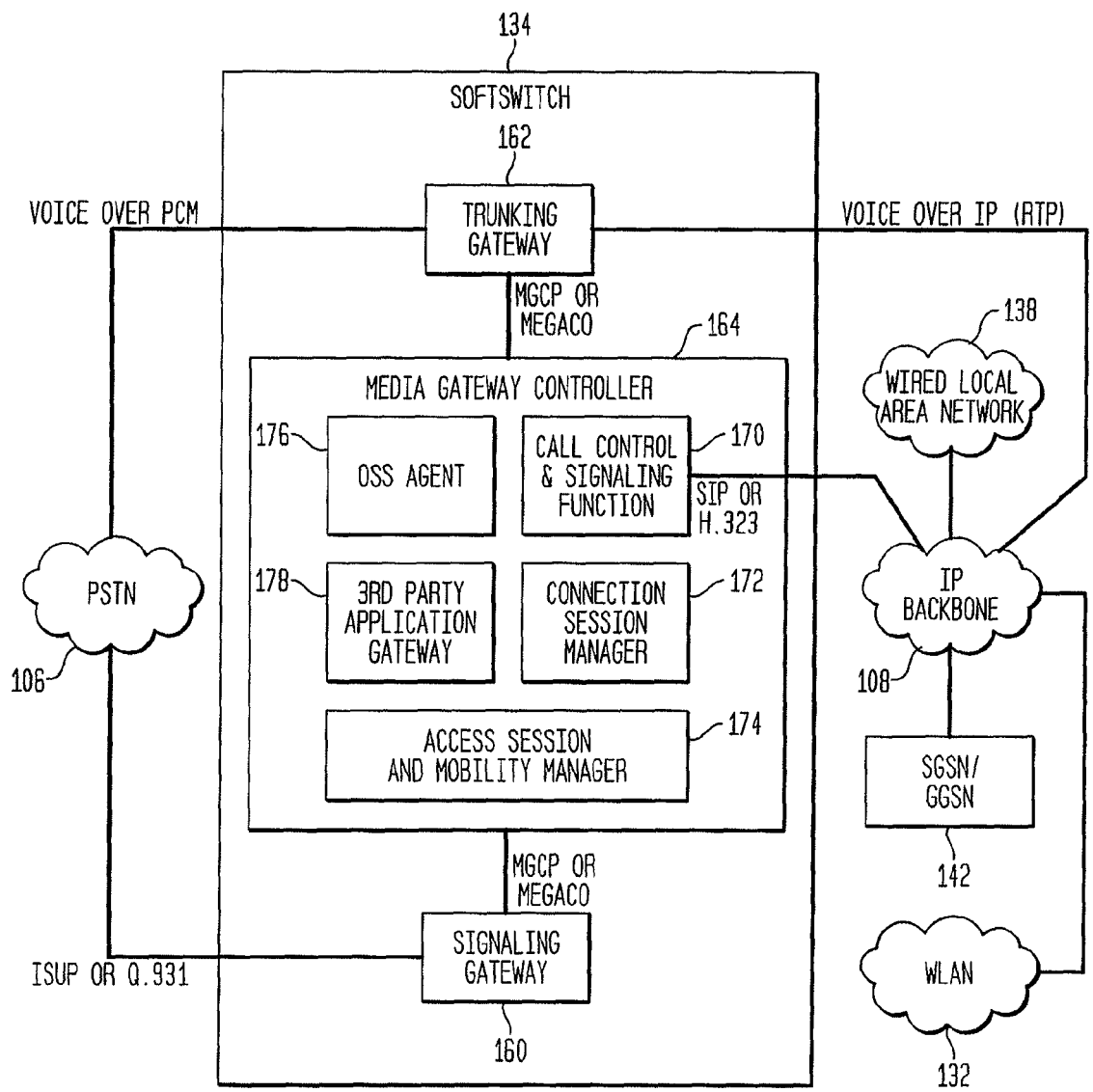
FIG. 5 is a block diagram of a soft switch embodiment.

FIG. 5 is a functional block diagram of a soft switch suitable for use with the invention. The soft switch 134 can be deployed as an off-site, IP-based PBX. The soft switch 134 can also be deployed as a gateway-assisted soft switch 344 (introduced below), a carrier-hosted soft switch 320 and an on-site soft switch 310. The chief difference among the soft switch architectures is typically the configuration of the external connections.

In FIG. 5, the various aspects of the soft switch are referred to as modules and/or functions. The terms "module" and "function," as used herein, mean, but are not limited to, a software or hardware component that performs certain tasks. A module may advantageously be configured to reside on addressable storage medium and configured to execute on one or more processors. A module may be fully or partially implemented with a general purpose integrated circuit (IC), field programmable gate array (FPGA) or application specific integrated circuit (ASIC). Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. Additionally, the components and modules may advantageously be implemented on many different platforms, including computers, computer servers, data communications infrastructure equipment such as application-enabled switches or routers, or telecommunications infrastructure equipment, such as public or private telephone switches or private branch exchanges (PBX). In any of these cases, implementation may be achieved either by writing applications that are native to the chosen platform, or by interfacing the platform to one or more external application engines.

Within the soft switch 134, the trunking gateway module 162 physically terminates calls and provides other physical layer services associated with transmitting and receiving voice-bearing traffic streams over the PSTN 106 as well as the IP backbone 108. For example, the trunking gateway 162 terminates voice calls from the PSTN 106, compresses and packetizes the voice data, and delivers compressed voice packets to the IP backbone 108. Likewise, the trunking gateway 162 performs the reverse functions for voice-bearing traffic streams received from the IP backbone 108. The trunking gateway 162 operates under the control of a media gateway controller module 164.

The signaling gateway module 160 provides interworking of signaling between the switched circuit PSTN 106 and packet switched IP backbone 108. The signaling gateway 160 also assists the media gateway controller module 164 with the call control functionality or service processing capabilities of traditional PSTN switches. The signaling gateway 160 also operates under the control of the media gateway controller module 164.

The media gateway controller module 164 handles the registration and management of resources at the soft switch 134. The media gateway controller module 164 further provides PBX services to mobile units connected to the WLAN 132 (through VGN 180) or to the wired local area network 138. The media gateway controller module 164 also provides control over and includes additional modules that are shown in FIG. 5 as entities 170-178. Within the media gateway controller module 164, the call control and signaling function module 170 maintains the call state and creates and processes the SIP or H.323 messages that can be directly received and output by the media gateway controller module 164 to and from the IP backbone 108. The connection session manager module 172 maintains the state of PSTN signaling including management of each physical trunk terminated at the trunking gateway 162 and the correlation between the PCM-based traffic streams and the IP-based traffic streams. The access session and mobility manager module 174 tracks user and subscriber device locations. The operation support system (OSS) agent module 176 provides a control and monitoring interface for use by the soft switch administrator. For example, the OSS agent 176 interfaces with billing systems, subscriber-provisioning systems and the like. The third party application gateway module 178 interfaces with applications such as content delivery services, voicemail services, and user information databases (such as the contact list information and corresponding categories as discussed above) that are typically hosted outside this domain.

The signaling gateway 160, trunking gateway 162 and media gateway controller module 164 are coupled within the soft switch 134. In one embodiment, these three components communicate with one another using SIP, SIGTRAN, Media Gateway Control Protocol (MGCP), MEGACO or a combination of these. SIGTRAN (SIGnalling TRANsport) is part of the Next Generation of Networks (NGN) based on the Internet protocol. It is designed for transporting signaling traffic such as ISDN, SS7 and V5 over an IP network. SIGTRAN is also used for VoIP applications. MEGACO standardizes the interface between a call control entity such as a media gateway controller module and the media processing entity such as a media gateway in the decomposed H.323 gateway architecture proposed by ETSI TIPHON and adopted by IETF. MGCP, developed by Telcordia and Level 3 Communications, is one of a several control and signaling standards to compete with the older H.322 standard for the conversion of signal carried on telephone circuits (PSTN) to data packets carried over the Internet or other packet networks.

Typically, the PSTN 106 is coupled to the trunking gateway 162 over traditional voice-over-PCM connections. The PSTN 106 is typically coupled to the signaling gateway 160 using a common-channel signaling protocol such as ISUP or Q.931. The ISDN User Part (ISUP) defines the protocol and procedures used to set-up, manage, and release trunk circuits that carry voice and data calls over the PSTN. Q.931/32 is a layer in the OSI/ISO Reference Model and has been designed for control signaling. It is used to establish maintain and release connections between the user and the PSTN network.

The trunking gateway 162 communicates with the IP backbone 108 using VoIP protocols such as VoIP/RTP. RTP (the RealTime Transport Protocol) is the standard proposed by IETF for real time transfer of media. RTCP (RealTime Transport Control Protocol) provides statistical information of media communication. The media gateway controller module 164 communicates with the IP backbone 108 using SIP or H.323. H.323 is an International Telecommunications Union (ITU) approved recommendation that defines how audio and video data may be communicated across packet-based networks, such as the Internet.

Figure 6:
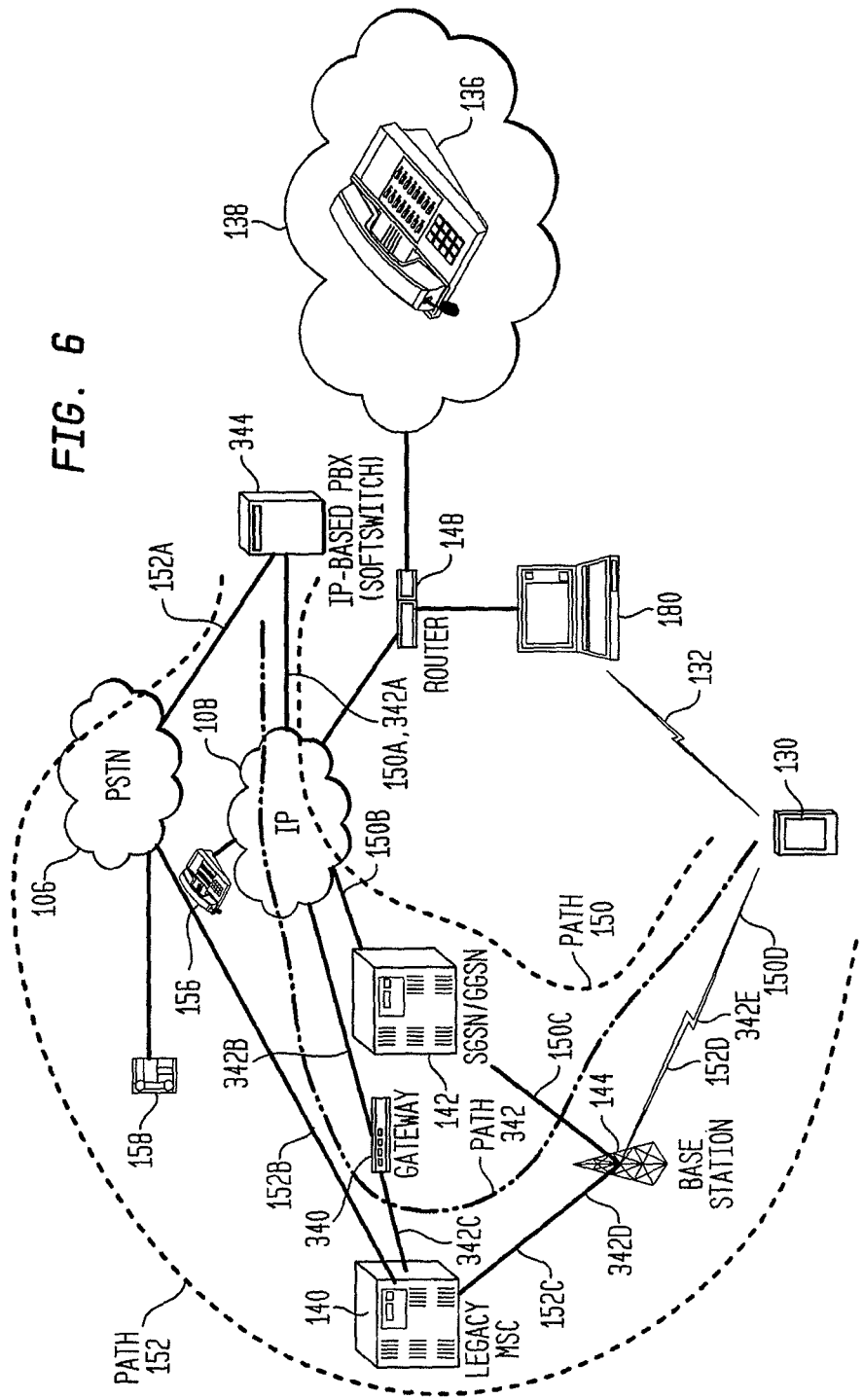
FIG. 6 is a network diagram showing a network embodiment that incorporates a media gateway between the soft switch and the mobile switching center.

FIG. 6 is a network diagram of a network that incorporates a media gateway between a soft switch and a mobile switching center. In FIG. 6, a media gateway 340 acts as a gateway between the soft switch 344 and the legacy MSC 140 to provide enhanced functionality. The media gateway 340 introduces a new path 342A-E. The soft switch 344 is coupled to the IP backbone 108 by a leg 342A, which in turn is coupled to the media gateway 340 by a leg 342B, which is coupled to the legacy MSC 140 by a leg 342C, which is coupled to the base station 144 by a leg 342D, which in turn is coupled to the dual-mode subscriber device 130 by a leg 342E. The legs 342D and 152C as well as the legs 342E and 152D are common to both the paths 152 and 342 and perform like functions in each path.

Figure 7:
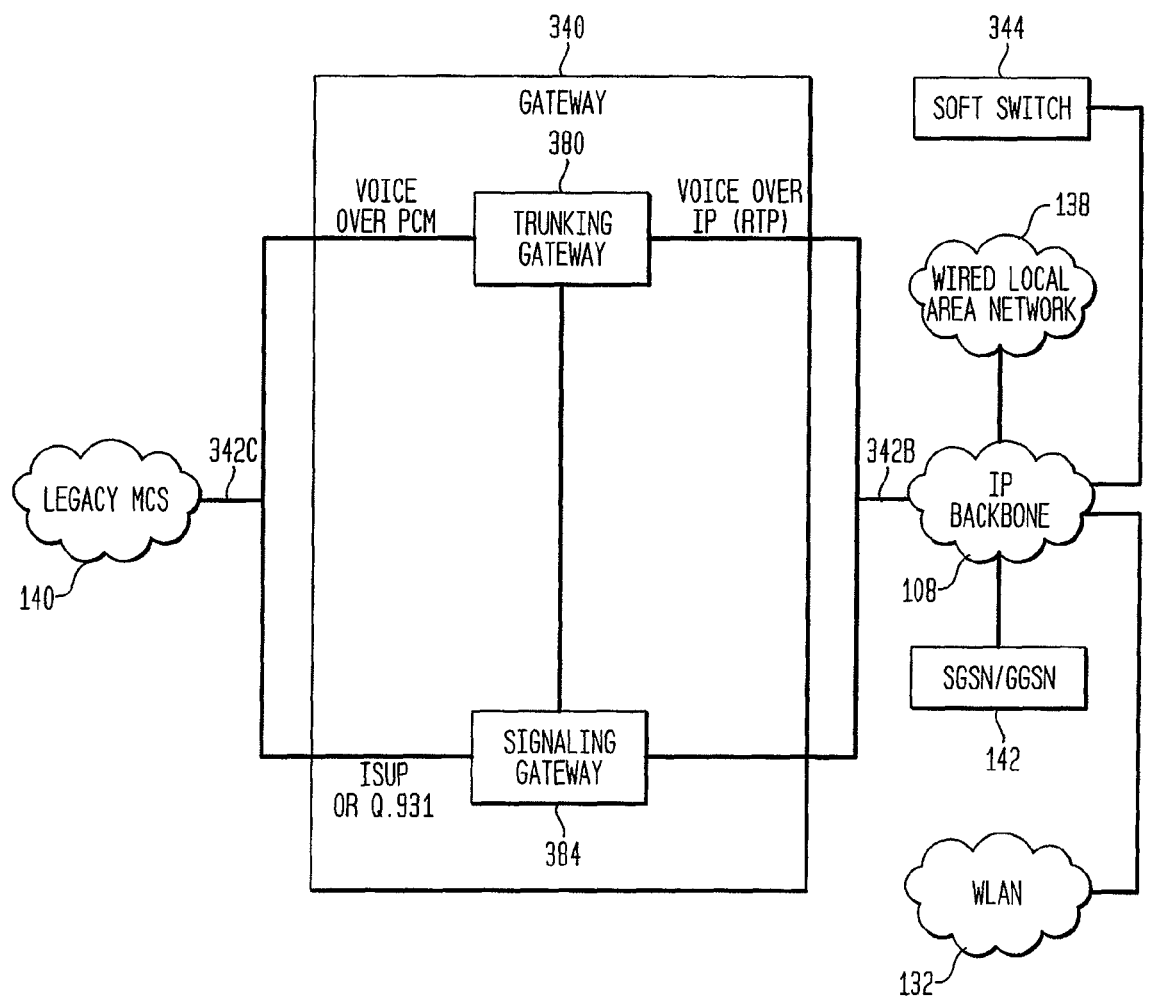
FIG. 7 is a block diagram of a media gateway suitable for use with an embodiment.

FIG. 7 is a block diagram of a media gateway suitable for use with the invention. As with FIG. 5, the various aspects of the media gateway are referred to as modules, with same meaning intended for that term. The trunking gateway module 380 performs the analogous functions of the trunking gateway module 162 of FIG. 5 such as translating between VoIP packets and legacy voice format signaling. The signaling gateway module 384 performs the analogous functions of the signaling gateway 160. In addition, the signaling gateway 384 translates the PSTN control signaling in IP format received from the media gateway 340 into standard PSTN signaling for output to the legacy MSC 140. In one embodiment, the signaling gateway 384 is also configured to transmit an artificial caller ID identifier on the PSTN port in response to instructions received over IP port from the soft switch 344. Both the trunking gateway 380 and the signaling gateway 384 are coupled to the legacy MSC 140 over the leg 342C shown in FIG. 6. Likewise, both the trunking gateway 380 and the signaling gateway 384 are coupled to the IP backbone 108 over the leg 342B shown in FIG. 6.

When the soft switch 344 switches a call to the dual-mode subscriber device 130 when it is within the coverage area of the cellular system, if the far end device is coupled to the PSTN 106, the soft switch 344 converts the legacy voice-bearing signals to VoIP packets and forwards them to the media gateway 340 over the legs 342A and 342B (see FIG. 6). The media gateway 340, (specifically, in the embodiment shown in FIG. 7, the trunking gateway module 380), converts VoIP packets back to legacy signals and provides them to the legacy MSC 140 over the leg 342C. In addition, the soft switch 344 can also send the standard PSTN call control signaling to the media gateway 340 in IP format over the legs 342A and 342B. The media gateway 340 (specifically, in the embodiment shown in FIG. 7, the signaling gateway module 384), can convert them to standard PSTN signaling and provide them to the legacy MSC 140 over the leg 342C.

If the far end device is a VoIP phone, the soft switch 344 sends control signaling in IP format to the media gateway 340 along the legs 342A and 342B. The far end device can also route control signaling directly to and from the media gateway 340 over the IP backbone 108 using the standard IP routing mechanisms. The VoIP packets can be routed directly to the media gateway 340 for conversion into legacy voice-bearing signals. For example, voice-bearing VoIP packets can be routed from the desk phone 136 through the on-premise router 148 and the over the leg 342B to the media gateway 340. The media gateway 340 is typically coupled to the legacy MSC 140 over a standard PSTN connection port.

The advantage of the network shown in FIG. 6 and the carrier-hosted network shown in FIG. 4 is that the direct connection to the legacy MSC 140 over, respectively, the leg 342C and the leg 324A allows greater flexibility by avoidance of the PSTN 106. The legacy MSC 140 can be configured to regard the signals on the legs 342C and 324A as PSTN signaling. The carrier soft switch 320 and the media gateway 340 can be configured to produce customized signaling in place of the standard PSTN signaling such as inserting data into the call stream, inserting artificial caller ID information and the like. An example of such a customization is given below.

Figure 8:
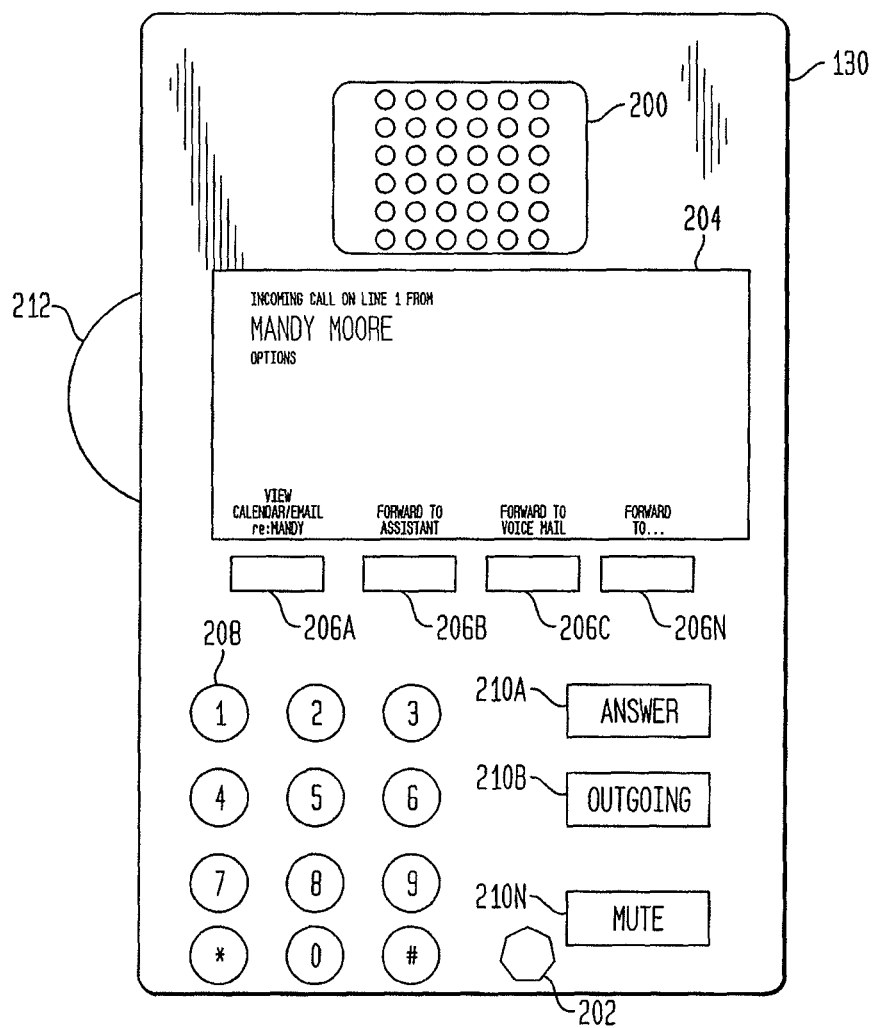
FIG. 8 is a drawing of a dual-mode subscriber device embodiment.

FIG. 8 is a representative drawing of an example of the dual-mode subscriber device 130. In the embodiment shown, the dual-mode subscriber device 130 also incorporates other functions such as email and calendaring and the like. The dual-mode subscriber device 130 has a speaker 200 and a microphone 202. The dual-mode subscriber device 130 also has a display 204. Several soft keys 206A-206N are associated with the display 204. A scroll wheel with select 212 can also be used to scroll through the various menus and select options. In addition, the dual-mode subscriber device 130 includes a keypad 208 and N defined function keys 210A This figure is highly representative and many other configurations and form factors for subscriber devices are well known in the art.

Figure 9:
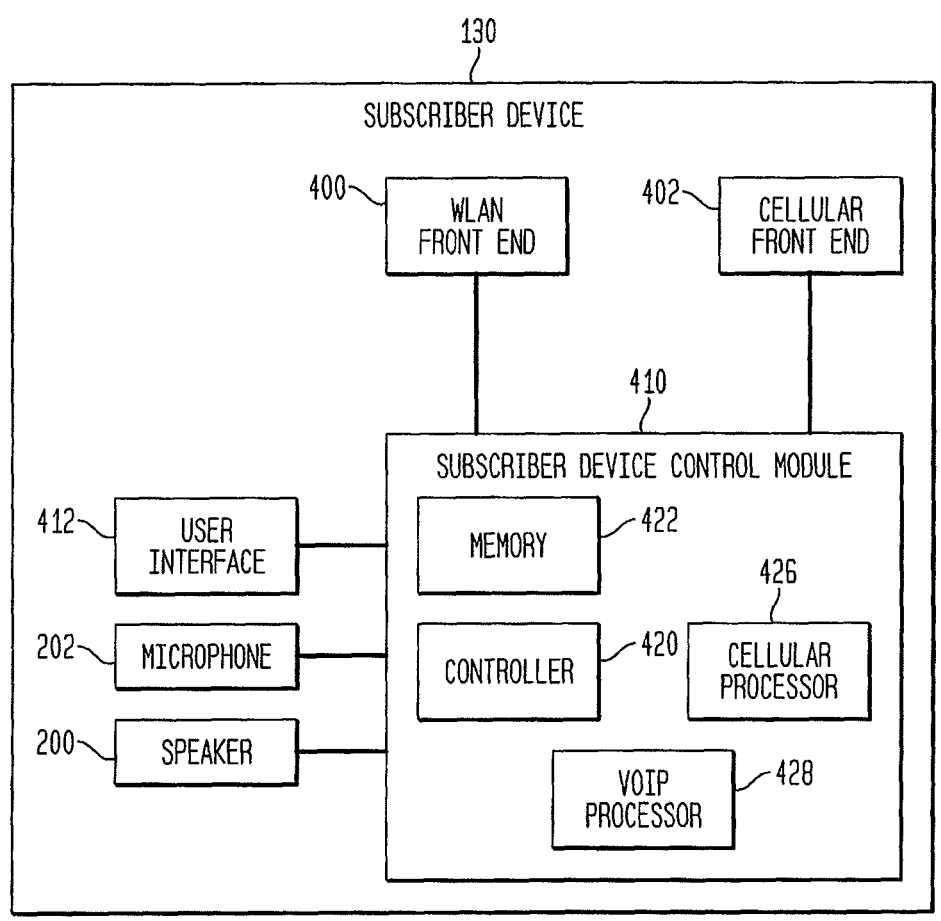
FIG. 9 is a block diagram of a dual-mode subscriber device embodiment.

FIG. 9 is a functional block diagram of the dual-mode subscriber device 130. The dual-mode subscriber device 130 has a WLAN front-end module 400 that receives and transmits wireless link signals over the WLAN 132 to the VGN 180. The WLAN front end 400 provides up and down conversion of signals as well as base band and media access control (MAC) layer functionality. For example, the WLAN front end 400 can be implemented using commercially available WiFi integrated circuits and software such as the PRISM3 chip set available from Intersil Inc., Irvine, Calif., USA. The WLAN front end 400 is coupled to and controlled by the subscriber device control module 410. The WLAN front end 400 outputs the information received over the WLAN to the subscriber device control module 410 and also receives information for transmission over the WLAN from the subscriber device control module 410.

The cellular front-end module 402 provides the functionality of a cellular subscriber device or cell phone for transmitting and receiving over a cellular telephone network. The cellular front-end module 402 also receives information from the subscriber device control module 410 and sends that information over the data-bearing and voice-bearing channels to the base station 144. Agere Systems, Inc. of Allentown, Pa. sells GSM reference design packages, which are based around Agere's digital signal processor (DSP) technology that includes all the software tools, training and support needed for manufacturers to develop their first or subsequent families of GSM handsets and can be used to make the cellular front-end module 402. Likewise, QUALCOMM, Inc. of San Diego, Calif., USA provides similar designs, chips and information for CDMA-based cellular networks that can also be used to make the cellular front end. The cellular front-end module 402 receives wireless link signals on both the data-bearing and voice-bearing channels from the base station 144 (see FIGS. 2, 3, 4 and 6) and extracts the information contained therein and passes it on to the subscriber device control module 410.

The subscriber device control module 410 provides control functions for the dual-mode subscriber device 130. The subscriber device control module 410 provides input to and accepts output from a user interface 412 (such as the display 204, soft keys 206A-206N, keypad 208, the microphone 202 and the speaker 200 of FIG. 8).

The subscriber device control module 410 also provides voice and data communication control. A controller module 420 provides control over the various subscriber device entities including those elements of the subscriber device control module 410 shown in FIG. 8. It can also execute application software and the like used by the dual-mode subscriber device 130. A memory module 422 stores information for use by the controller module 420 as well as the other subscriber device control module 410 elements.

The subscriber device control module 410 also includes a WLAN/VoIP processing module 428 for creating and receiving VoIP packets over the WLAN front end 400. For example, the VoIP processing module 428 provides audio signals to the speaker 200 and receives audio signals from the microphone 202 when the dual-mode subscriber device 130 is communicating over the WLAN front end 400 such as when the dual-mode subscriber device 130 is located within the coverage area of the WLAN 132. Thus, the VoIP processing module 428 is coupled to the speaker 200, microphone 202 and WLAN front end 400 as well as other elements. VoIP processing modules are well-known in the art. The VoIP processing module can be implemented, e.g., using commercially available VoIP platforms such as the WV8307 Wireless VoIP Phone chip set available from Agere Systems, Inc., Allentown, Pa., USA.

The subscriber device control module 410 further includes a cellular processing module module 426 for creating and receiving cellular information, such as the audio information received from and transmitted over the voice-bearing path of the cellular network. The cellular processing module 426 is coupled to the cellular front end 402 as well as the speaker 200 and the microphone 202. Such cellular processing modules are also well-known in the art. For example, the cellular processing module can be implemented, e.g., using commercially available processors such as the TC36507 processor available from Agere Systems, Inc., Allentown, Pa., USA. It will be recognized, however, that although the controller module 420, memory 422, cellular processing module 426 and VoIP processing module 428 are described above as separate modules or circuits, they may also be integrated on a single integrated circuit.

As noted above, the access session and mobility manager 174 within the soft switch 134 tracks the location of the dual-mode subscriber device 130. Several mechanisms can be used to implement such tracking. The soft switch 310 can "ping" (send a message requesting a response) the subscriber device via the VGN 180 and WLAN 132 and assume that the dual-mode subscriber device 130 is absent if no response is received. Alternatively, the dual-mode subscriber device 130 may detect that it can no longer receive signals from the WLAN 132 and, in response, send a cellular-based data message over the path 150 (see FIG. 6) registering its departure from the coverage area of the WLAN 132. Likewise, when the dual-mode subscriber device 130 enters the coverage area of the WLAN 132 once again, it may send a WLAN-based message to the VGN 180, which in turn may send a SIP or H.323-based message to the soft switch 310 registering the device's re-entry to the WLAN area. In addition, the user may manually signal the return of the dual-mode subscriber device 130 through the VGN 180 (e.g., by pressing keys) or by docking the dual-mode subscriber device 130 at the VGN 180, which causes the VGN 180 to transmit a message to the soft switch.

Figure 10:
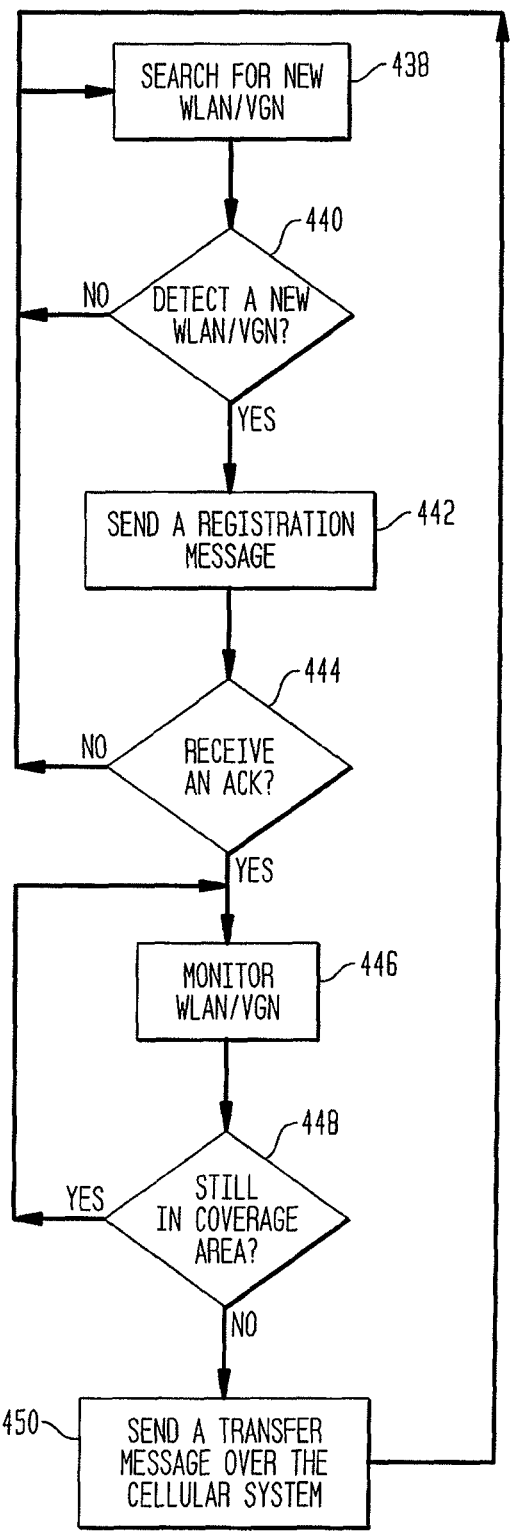
FIG. 10 is a flowchart of a process embodiment by which the dual-mode subscriber device registers its location.

FIG. 10 illustrates the method or process by which the dual-mode subscriber device 130 may register its location. In block 438, the dual-mode subscriber device 130 uses standard WLAN searching techniques to determine whether it has entered the coverage area of a new WLAN under the control of a new VGN 180. If so, in block 440, the dual-mode subscriber device 130 detects the new WLAN and VGN 180 and flow continues to block 442. In block 442, the dual-mode subscriber device 130 sends a WLAN-based registration message over the WLAN to the VGN 180, which passes the registration message (e.g., as a SIP or H.323 registration message) to an appropriate soft switch. If the message successfully reaches a soft switch willing to provide service, in block 444 the dual-mode subscriber device 130 receives an acknowledgement via the VGN 180 and WLAN and flow continues to block 446. If no new WLAN and VGN 180 are detected or no acknowledgment is received, the dual-mode subscriber device 130 continues to scan for a new WLAN and VGN 180 in block 438.

While registered with the VGN 180 via the WLAN, in block 446 the subscriber device continues to monitor whether VGN 180/WLAN service is available. If the dual-mode subscriber device 130 detects that it has left the coverage area of the WLAN in block 448, the dual-mode subscriber device sends a new registration message to the soft switch over the cellular system in block 450. The dual-mode subscriber device 130 once again begins to monitor for a new WLAN connection in block 438.

The VGN 180 and soft switch 134 perform complementary functions as those described above in conjunction with the subscriber device operation depicted in FIG. 10. In response to the WLAN registration message sent in block 442, the VGN 180 registers the subscriber device's presence in memory and forwards the registration message (e.g., as a SIP or H.323 registration message) to the soft switch 134. The soft switch 134 creates and sends the SIP or H.323-based acknowledgement message to the VGN 180, which in turn passes the acknowledgement to the subscriber device in block 444.

Advantageously, the system may be implemented without robbing the subscriber device of its cellular identity. For example, assume the cellular carrier assigns a cellular telephone number to the subscriber device. Further, assume that the soft switch 134 has assigned a different PBX telephone number to the subscriber device. Thus, the subscriber device is associated with a cellular number as well as a PBX number. The cellular number can still be used to contact the subscriber device directly even when it is under the control of the soft switch 134 via the VGN 180.

Further, if neither the soft switch 134 nor the VGN 180 has valid location data for the subscriber device, the soft switch 134 can simply forward incoming calls to the subscriber device over the standard cellular system using its cellular telephone number. In such a case, the subscriber device may send a cellular data-based signaling message to the soft switch, in order to have available some calling features that would otherwise be unavailable for a standard cellular call. For example, assume a first caller places a call to the dual-mode subscriber device 130 using the cellular number. When the dual-mode subscriber device 130 receives the call, it can use caller ID to identify the caller by receiving caller ID information from the soft switch 134 via the data path of the cellular network.

Figure 11:
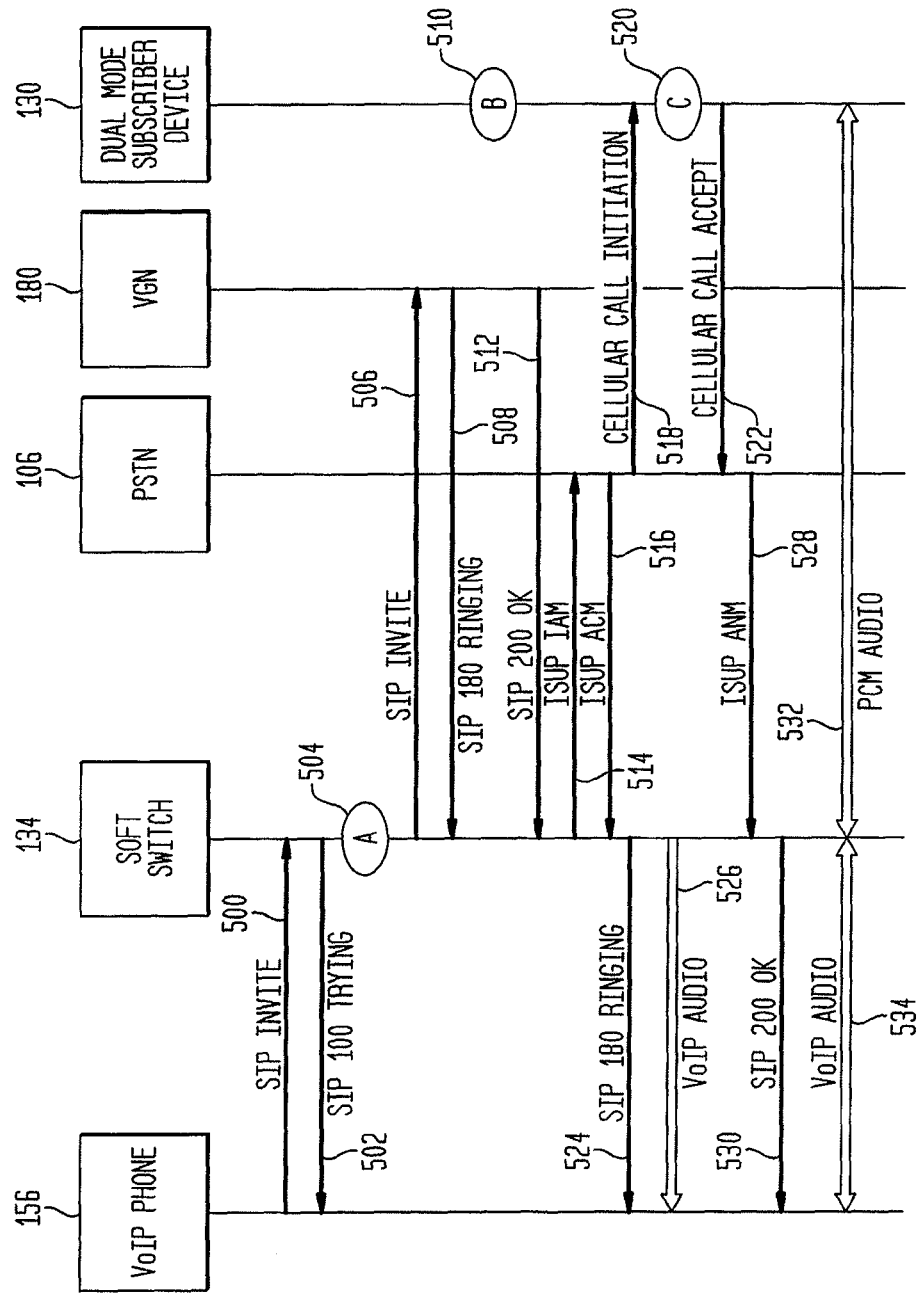
FIG. 11 is a call flow diagram illustrating an exemplary call flow embodiment where an IP device initiates a call to a dual-mode subscriber device.

FIG. 11 illustrates an exemplary call flow when an IP phone initiates a call to a dual-mode subscriber device that is currently located outside the WLAN in a system in which SIP is employed. The call flow or processing will be described with reference also being made to the embodiment of a soft switch depicted in FIG. 5 and the example network shown in FIG. 2. The specific order of the described methods can be varied depending on system requirements and taking into account the effect on the call flow.

In block 500, a calling IP phone, such as the VoIP phone 156 or desk phone 136 (in FIG. 2) sends a standard SIP invite message, such as SIP INVITE, specifying the dual-mode subscriber device 130 by its PBX telephone number, SIP URL (Uniform Resource Locator) or IP address. In block 502, the soft switch 134 receives the invite and responds with a SIP trying message such as SIP 100 TRYING, indicating to the initiating device that the soft switch is trying to set up the call. In block 504, the soft switch 134 reviews the call processing information associated with the dual-mode subscriber device 130, such as user-defined settings, registration information and/or whether the subscriber device is associated with a given WLAN/VGN 180. The soft switch 134 determines to contact the dual-mode subscriber device 130 in the cellular network based upon the expected location of the subscriber device 130, e.g., as determined via the process described above in connection with FIG. 10.

Referring back to FIG. 5, in one embodiment the SIP invite message (block 500) is received at the media gateway controller module 164 within the soft switch 134. Within the media gateway controller module 164, the call control and signaling function 170 processes the SIP invite message and commands the transmission of the SIP trying message (block 502). The third party application gateway 178 accesses information about the user's settings used in block 504, including whether the subscriber device is associated with, and under the control of, an existing VGN 180. The access session and mobility manager 174 provides information regarding the location of the dual-mode subscriber device 130 used in block 504.

Assuming that the subscriber device 130 is associated with a particular VGN 180 (even though it may not be within that VGN 180's WLAN area), the VGN 180 may play an active role in establishing, maintaining and monitoring the call to the subscriber device 130. In block 506, the soft switch 134 sends a standard SIP invite message to the VGN 180 associated with the device, in order to inform the VGN 180 that a cellular-based call is being established with the subscriber device. The soft switch 134 identifies the dual-mode subscriber device 130 in the SIP invite message using standard IP methods such as by its IP data address. The VGN 180 may respond to the soft switch 134 by sending it a SIP ringing indication such as SIP 180 RINGING as in block 508 or some other acknowledgement such as a call accept message (or SIP 200 OK) as in block 512.

In block 514, the soft switch 134 initiates a call to the subscriber device with the PSTN 106 using one of a variety of standard PSTN signaling protocols. In one embodiment, the soft switch 134 uses the ISUP and, therefore, sends an ISUP initial address message (IAM) to the PSTN 106, such as over the leg 152A. ISUP IAM reserves an idle trunk circuit from the originating switch to the destination switch and identifies the dual-mode subscriber device 130, e.g., by its cellular telephone number. In block 516, the PSTN 106 responds with an address complete message (ACM). The ACM indicates that all address signals have been received and that call set-up is progressing. In response to block 514, the PSTN 106 sends a cellular call initiation message in block 518 according to well-known practices. The PSTN signaling in blocks 514, 516 and 528 can be controlled by the call control and signaling function 170 and the connection session manager module 172 within the media gateway controller module 164 and implemented by the signaling gateway 160. In block 520, the dual-mode subscriber device 130 automatically accepts the incoming cellular call and responds with a cellular call accept in block 522.

Referring back to the block diagram of the subscriber device of FIG. 9, the incoming cellular call initiation message of block 518 is received at the dual-mode subscriber device 130 through the cellular front end 402. The cellular front end 402 passes the information received to the cellular processing module 426, which parses the message. In one embodiment, the cellular processing module 426 sends an indication to the controller module 420 that, in turn, commands the notification of the user. For example, the controller module 420 may command a ring tone, a custom microphone message (such as "Marie is calling"), a display message, a series of soft key options and the like using the user interface 412 and the microphone 202. The controller module 420 also commands the cellular processing module 426 to create a responsive indication for transmission over the wireless link by the cellular front end 402. For example, if the user accepts the call, the controller module 420 commands the cellular processing module 426 to create a corresponding response message for transmission over the wireless link by the cellular front end 402.

Meanwhile, the soft switch 134 responds to the VoIP phone 156 with a SIP ringing indication (SIP 180 RINGING) in block 524 and, and in a logical sense, establishes a unidirectional VoIP voice-bearing path from the soft switch 134 to the VoIP phone 156 in block 526. Using VoIP, no actual circuit switched channel is established or reserved but, instead, voice-bearing packets begin to stream from one party to another. In this case, packets carrying a ring indicator are streamed from the trunking gateway 162 to the VoIP phone 156.

In block 528, the PSTN 106 responds to the cellular call accept with an ISUP answer (ANM). The ANM indicates that the called party has answered the call. It can be used to trigger billing, measurement of call duration and the like. In response, in block 530, the soft switch 134 sends a SIP OK message to the VoIP phone 156. In block 532, a telephone channel is allocated and a bi-directional audio path from the trunking gateway 162 within the soft switch 134 through the PSTN 106 to the dual-mode subscriber device 130 is established, such as using the path 152. A bi-directional VoIP voice-bearing path from the trunking gateway 162 within the soft switch 134 to the VoIP phone 156 is established in block 534 and the soft switch 134 connects it to the established PCM audio path, thus completing a voice link from the VoIP phone 156 to the dual-mode subscriber device 130. During this process, the soft switch 134 constantly relays call status results and error messages (if any) to the VGN 180.

Alternatively, the cellular voice channel may be established by a call origination from the dual-mode subscriber device 130 itself (under the control of the VGN 180), rather than the soft switch 134. For example, referring again to FIG. 11, the SIP INVITE message (such as the one sent in block 506) or another SIP message designates that an incoming call has arrived at the soft switch and is forwarded to the VGN 180 in block 506. In response to the message, the VGN 180 may send a self-call request to the soft switch 134 on behalf of the dual-mode subscriber device 130. In turn, the soft switch 134 accepts the self-call request to initiate a call to the subscriber device 130, relays the request to the PSTN 106 (or, alternatively, to the gateway GPRS support node/serving GPRS support node (SGSN/GGSN) 142), and waits for the PSTN 106 or SGSN/GGSN 142 to establish the connection to the subscriber device 130. For its part, the PSTN 106 or SGSN/GGSN 142 sends an acknowledgement to the soft switch 134 of the self-call request, and initiates a silent call to the subscriber device 130. Depending on the response of subscriber device 130 to the silent self-call, the PSTN 106 or SGSN/GGSN 142 sends either a self-call success or error message to the soft switch 134.

Finally, assuming that the self-call was successful, the soft switch 134 correlates the self-call from the dual-mode subscriber device 130 with the pending call establishment. The soft switch 134 then switches the incoming cellular call to connect to the established VoIP audio path and the call flow continues in the manner shown in FIG. 11. This self-call origination strategy can be used in conjunction with several of the call flows that follow.

Referring once again to FIG. 9, the voice-bearing traffic channel information is received and transmitted at the dual-mode subscriber device 130 using the cellular front end 402, the cellular processing module 426 and the microphone 202 and speaker 200.

Figure 12:
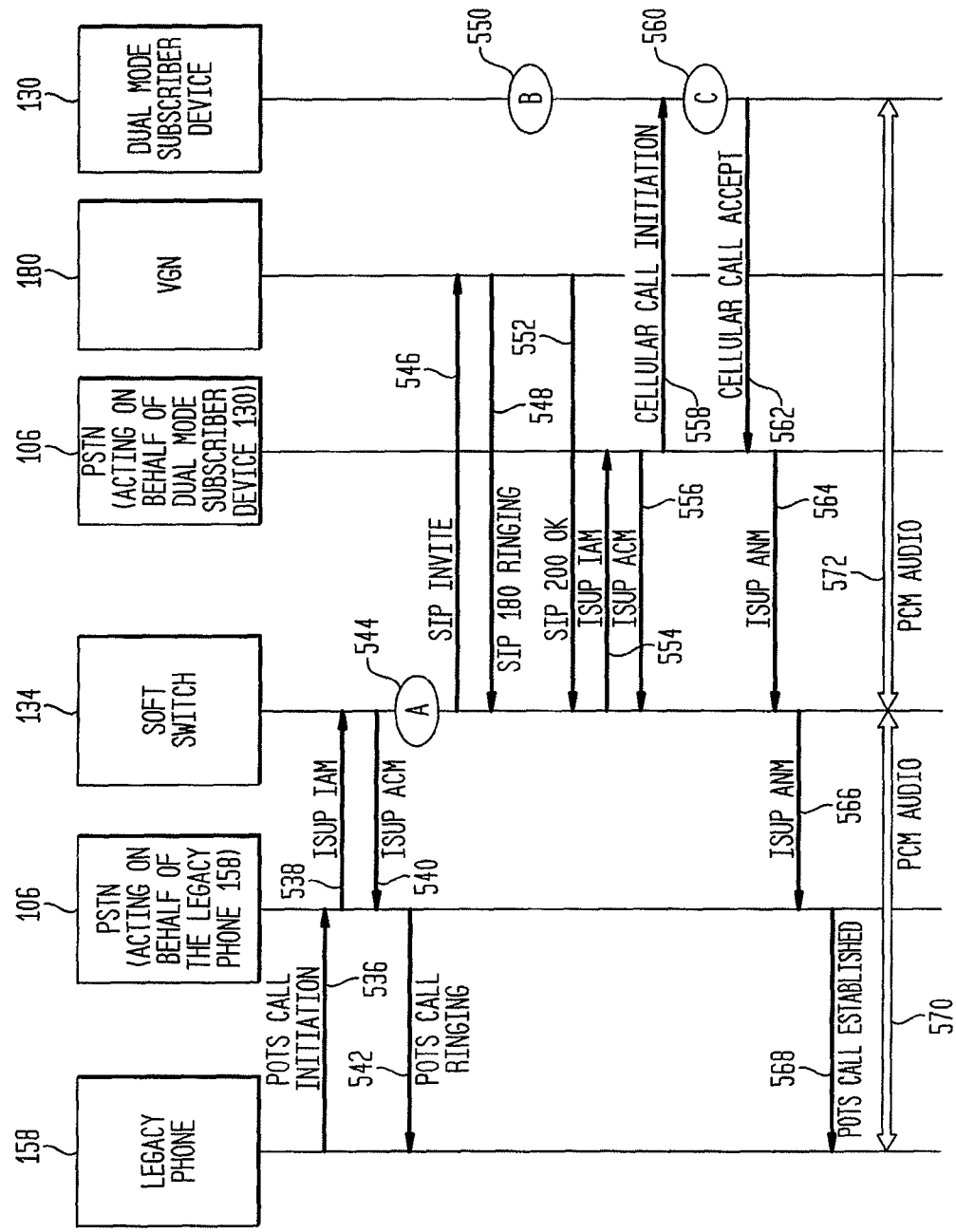
FIG. 12 is a call flow diagram illustrating an exemplary call flow when a PSTN device embodiment initiates a call to a dual-mode subscriber device.

FIG. 12 illustrates an exemplary call flow when a PSTN phone initiates a call to a dual-mode subscriber device that is currently located outside the WLAN of the VGN 180 associated with the subscriber device. As in FIG. 11, the call flow in FIG. 12 is also described with reference to FIGS. 5 and 2, and the specific order of the described blocks can be varied depending on system requirements and taking into account the effect on the call flow.

In block 536, a calling phone, such as the legacy phone 158, sends a plain old telephone system (POTS) call initiation message to the PSTN 106 designating the PBX telephone number of the dual-mode subscriber device 130. In block 538, the PSTN 106 (acting on behalf of the legacy phone 158) sends an ISUP IAM to the soft switch specifying the dual-mode subscriber device 130 by its PBX telephone number. In block 540, the soft switch 134 responds with an ISUP ACM. In block 542, the PSTN 106 sends a POTS call ringing message to the legacy phone 158.

In block 544, the soft switch 134 reviews the call processing information associated with the dual-mode subscriber device 130 such as the user-defined settings, registration information, and associated VGN 180. In this case, the soft switch 134 determines (either with or without consultation with the associated VGN 180) to contact the dual-mode subscriber device 130 in the cellular network. In block 546, the soft switch 134 sends a SIP invite message to the associated VGN 180, to which the VGN 180 responds with an acknowledgement such as SIP 180 Ringing in block 548 and/or SIP 200 OK in block 552.

In block 554, the soft switch 134 sends an ISUP IAM to the PSTN 106 specifying the dual-mode subscriber device 130 by its cellular telephone number. In block 556, the PSTN 106, acting on behalf of the dual-mode subscriber device 130, responds with an ACM. In response to the block 554, the PSTN 106 sends a cellular call initiation in block 558. In block 560, the dual-mode subscriber device 130 accepts the call. The dual-mode subscriber device 130 responds with a cellular call accept in block 562. In block 564, the PSTN 106 responds to the cellular call accept with an ISUP ANM. These PSTN blocks can occur before, after or in parallel with the SIP blocks just described. In addition, the self-call origination strategy discussed above could be used to establish the call connection.

Referring back to again FIG. 9, the incoming cellular call initiation of block 558 is received at the dual-mode subscriber device 130 through the cellular front end 402. The cellular front end 402 passes the information received over the wireless link to the cellular processing module 426, which parses the message. The cellular processing module 426 sends a message to the controller module 420. If the user accepts the call, the controller module 420 commands the cellular processing module 426 to create a corresponding response message for transmission over the wireless link by the cellular front end 402 such as sent in block 562.

Referring again to FIG. 12, in block 566, the soft switch 134 sends an ISUP ANM message PSTN 106. In block 568, the PSTN 106 sends a POTS call established message to the legacy phone 158. In block 570, a PCM audio path from the legacy phone 158 to the soft switch 134 is established. In block 572, a circuit-switched voice channel is allocated and a PCM audio path is established through the PSTN 106 to the dual-mode subscriber device 130, such as using path 152, and the soft switch 134 connects it to the PCM audio path established in block 570. Thus, a voice bearing traffic channel from the legacy phone 158 to the dual-mode subscriber device 130 is completed.

Referring again to FIG. 9, the voice-bearing traffic channel information is received and transmitted at the dual-mode subscriber device 130 using the cellular front end 402, the cellular processing module 426 and the microphone 202 and speaker 200.

Again assuming that the subscriber device 130 is associated with a given VGN 180, the call flow for subscriber device-initiated calls is similar to the call flows discussed above in connection with FIGS. 11 and 12 for calls received by the dual-mode subscriber device 130. When the dual-mode subscriber device 130 is the call initiator, the dual-mode subscriber device 130 sends a standard cellular call initiation message, which preferably specifies a surrogate telephone number associated with the soft switch 134 rather than the actual called party. The dual-mode subscriber device 130 may also send a cellular data message that specifies the actual called party such as a PSTN device or VoIP device, either outside or within the same PBX as the subscriber device. The soft switch 134 correlates the two messages and establishes the appropriate voice paths in an analogous manner to the reverse process shown above, all the while relaying SIP messages, call status results and error messages (if any) to the VGN 180.

Whether the dual-mode subscriber device 130 is the called or the calling party, a voice-bearing cellular path and a parallel data signaling cellular path are preferably established with the dual-mode subscriber device 130. The parallel data-signaling path allows the user of the dual-mode subscriber device 130 to access PBX features such as those available to him on a standard office desk phone.

As just noted, standard calls placed by the dual-mode subscriber device 130 when it is within the cellular footprint and outside the WLAN preferably designate a surrogate number associated with the soft switch 134 rather than the actual called party. Therefore, as soon as the user indicates that he is going to place a call, such as by dialing the first digit of any phone number, the dual-mode subscriber device 130 can begin the process of initiating the voice-bearing traffic stream over the path 152 using the surrogate number. In addition, if the system employs a responsive soft switch initiation strategy (described below), as soon as the user indicates that he is going to place a call, the dual-mode subscriber device 130 can send a message over the data-bearing path 150 to alert the soft switch 134 to initiate a call to the dual-mode subscriber device 130. In this way, the delay associated with establishment of a cellular voice call is masked and the response of the system is much faster as perceived by the human user.

Figure 13:
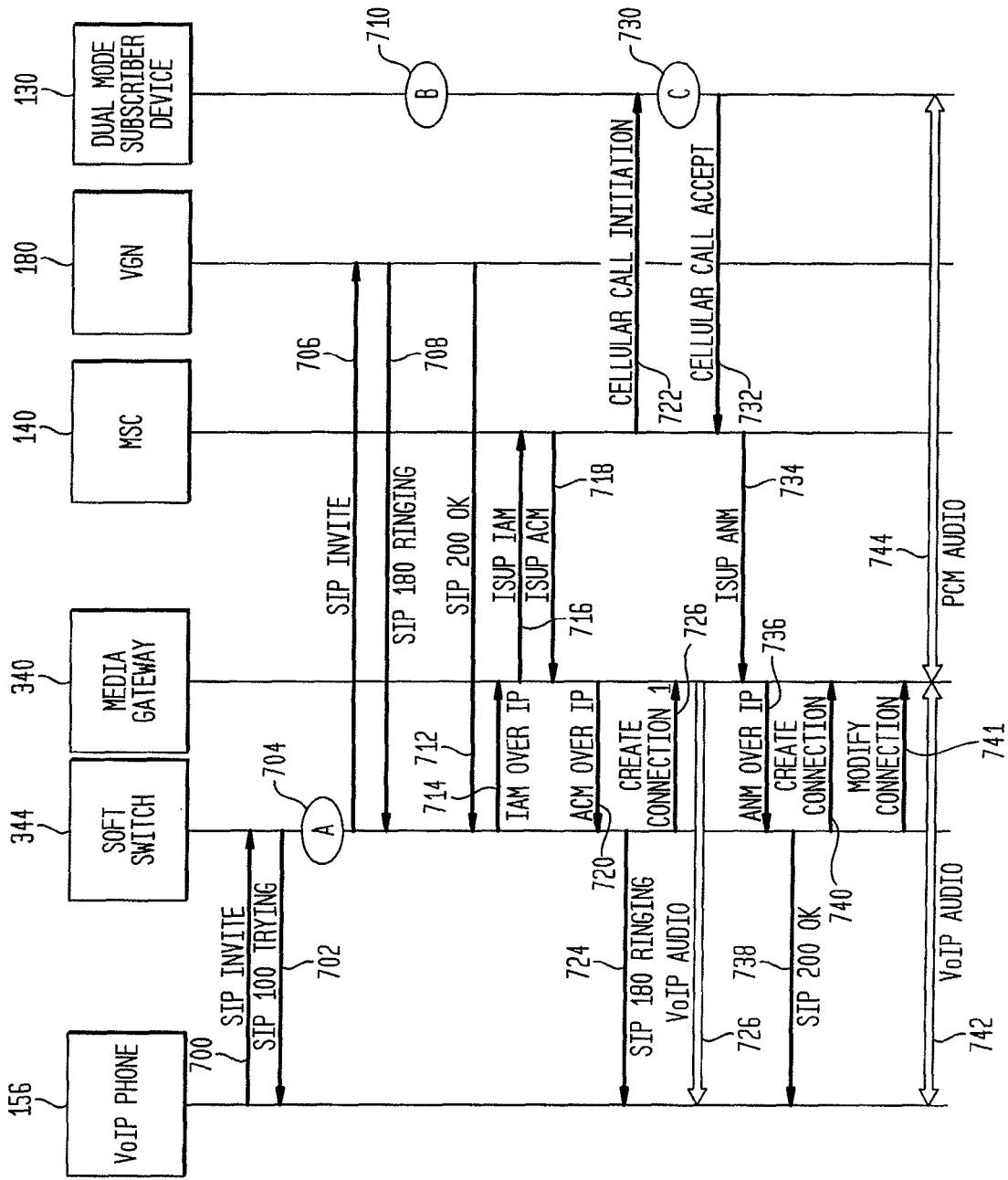
FIG. 13 is a call flow diagram illustrating exemplary call flow embodiment when an IP device initiates a call in a system that employs a media gateway.

FIG. 13 illustrates an exemplary call flow when an IP phone, such as VoIP phone 156, initiates a call to a dual-mode subscriber device that is currently located outside the WLAN in a system that employs a media gateway between the soft switch and the legacy MSC such as shown in FIG. 6. The specific order of the described blocks can be varied depending on system requirements and taking into account the effect on the call flow.

In block 700, the VoIP phone 156 sends a SIP invitation message specifying the PBX telephone number or other identifier such as the SIP URL or IP address of the dual-mode subscriber device 130. The soft switch 344 receives the invite and responds with a SIP trying message in block 702. In block 704, the soft switch 344 reviews the call processing information associated with the dual-mode subscriber device 130, such as the user-defined settings, registration information and associated VGN 180. The soft switch 344 determines to contact the dual-mode subscriber device 130 in the cellular network. In block 706, the soft switch 344 sends a SIP invitation message to the VGN 180, identifying the dual-mode subscriber device 130 using standard IP addressing techniques. The VGN 180 responds by sending a SIP ringing indication message (as in block 708) and/or a SIP 200 OK message (as in block 712) to the soft switch 344.

To command the media gateway 340 to initiate the voice-bearing traffic channel, the soft switch 344 creates an IP message for transmission over the IP network to the media gateway 340, such as over the legs 342A and 342B. The message indicates an initiation of a call over the cellular network to the dual-mode subscriber device 130 designated by its cellular telephone number. As such, in block 714, the soft switch 344 sends an IAM message or like call initiation message in IP format over the IP backbone 108 to the media gateway 340 designating the dual-mode subscriber device 130 by its cellular telephone number.

In block 716, the media gateway 340 receives the IP-formatted message and, in response, signals a call establishment attempt to the legacy MSC 140, such as over the leg 342C, using one of a variety of standard PSTN signaling protocols. In this case, the media gateway 340 sends an ISUP IAM. In block 718, the legacy MSC 140 responds with an ACM. The message is received by the media gateway 340 and, in block 720, the media gateway 340 creates a corresponding IP formatted message and sends it to the soft switch 344 over the IP backbone 108.

In response to block 716, the legacy MSC 140 initiates a cellular call in block 722 according to well-known practices. In block 730, the dual-mode subscriber device 130 accepts the call. In particular, the dual-mode subscriber device 130 responds with a cellular call accept in block 732, and the legacy MSC 140 in turn responds with an ANM to the media gateway 340 in block 734. The media gateway 340 responds to the soft switch 344 with an IP message with the ANM message information in block 736. These PSTN blocks can occur before, after or in parallel with the SIP blocks just described.

Meanwhile, the soft switch 344 responds to the VoIP phone 156 with a SIP ringing indication message in block 724. The soft switch 344 sends a first create connection message to the media gateway 340 in block 726. The first create connection message instructs the media gateway 340 to allocate resources to the VoIP audio path to be used in block 728 and later in block 742. The MGCP is used in this example although other protocols could be used such as Megaco or other media gateway control protocols. In a logical sense, the media gateway 340 establishes a unidirectional VoIP voice-bearing path from the media gateway 340 to the VoIP phone 156 in block 728 and voice-bearing packets begin to stream from the media gateway 340 to the VoIP phone 156.

In response to the IP ANM message sent in block 736, the soft switch 344 sends a SIP OK message to the VoIP phone 156 in block 738. The soft switch 344 sends a second create connection message to the media gateway 340 in block 740. The second create connection message instructs the media gateway 340 to allocate resources to the PCM audio path to be used to establish a voice connection. In block 744, a telephone channel is allocated and a bi-directional audio path from the media gateway 340 through the PSTN 106 to the dual-mode subscriber device 130 is established, such as using the legs 342C, 342D and 342E. In block 741, the soft switch 344 sends a modify connection message to the media gateway 340 instructing it to connect together the two previously created endpoints and to perform media conversion as necessary, for example converting between IP encoded and PCM encoded voice signaling. In block 742, a bi-directional VoIP voice-bearing path from the media gateway 340 to the VoIP phone 156 has been established, thus completing a voice link from the VoIP phone 156 to the dual-mode subscriber device 130. During this process, the soft switch 134 constantly relays SIP messages, call status results and error messages (if any) to the VGN 180.

Figure 14:
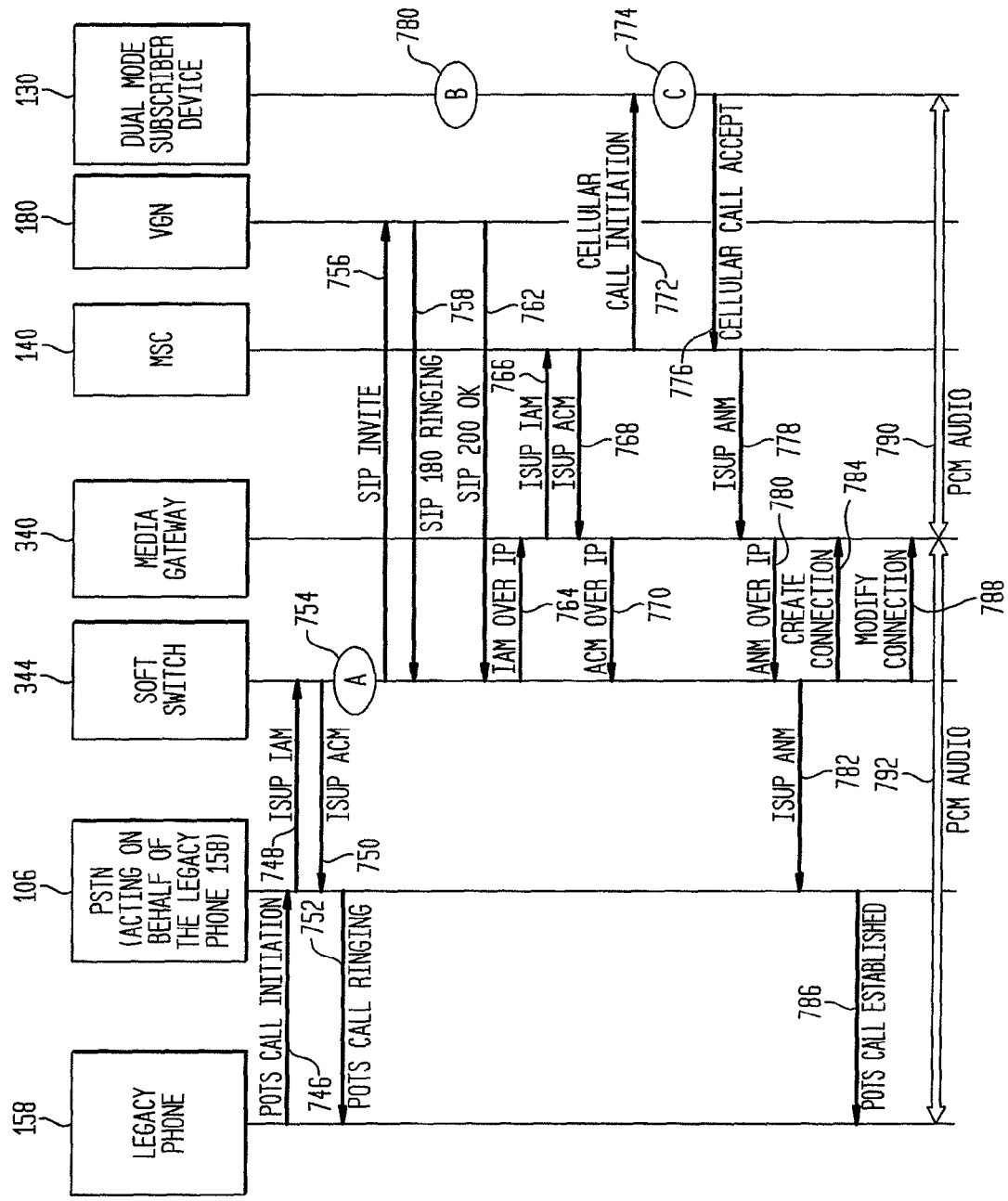
FIG. 14 is a call flow diagram illustrating exemplary call flow embodiment when a PSTN device initiates a call in a system that employs a media gateway.

FIG. 14 illustrates an exemplary call flow when a legacy phone initiates a call to a dual-mode subscriber device that is currently located outside the WLAN in a system that employs a media gateway between the soft switch and the legacy MSC such as shown in FIG. 6. The specific order of the described blocks can be varied depending on system requirements and taking into account the effect on the call flow.

In block 746, a PSTN device, such as the legacy phone 158, sends a POTS call initiation to the PSTN 106 designating the PBX telephone number of the dual-mode subscriber device 130. In block 748, the PSTN 106 (acting on behalf of the legacy phone 158) sends an ISUP IAM (or other call initiation message depending on the protocol in use) specifying the dual-mode subscriber device 130 by its PBX telephone number. In block 750, the soft switch 344 responds with an ISUP ACM. In block 752, the PSTN 106 sends a POTS call ringing indication to the legacy phone 158.

In block 754, the soft switch 344 reviews the call processing information associated with the dual-mode subscriber device 130, such as user-defined settings, registration information, and associated VGN 180. The soft switch 344 determines to contact the dual-mode subscriber device 130 in the cellular network. In block 756, the soft switch 344 sends a SIP invitation message to the dual-mode subscriber device 130 over the data-bearing path of the cellular network, such as the path 150 of FIG. 6. In block 758, the VGN 180 responds by sending a SIP ringing indication message such as SIP 180 RINGING or an OK message (such as SIP 200 OK) to the soft switch 344 as in block 762.

To command the media gateway 340 to initiate the voice-bearing traffic channel, the soft switch 344 creates an IP message for transmission over the IP network to the media gateway 340, such as over the legs 342A and 342B. The message indicates an initiation of a call over the cellular network to the dual-mode subscriber device 130 designated by its cellular telephone number. As such, in block 764, the soft switch 344 sends an IAM message in IP format over the IP backbone 108 to the media gateway 340 designating the dual-mode subscriber device 130 by its cellular telephone number.

In block 766, the media gateway 340 translates the IP message and signals a call establishment attempt to the legacy MSC 140 using standard PSTN signaling, such as over the leg 342C. In block 768, the legacy MSC 140 responds with an ISUP ACM. The message is received by the media gateway 340 and, in block 770, the media gateway 340 sends a corresponding ACM over IP message to the soft switch 344.

In response to the block 766, the legacy MSC 140 initiates a cellular call in block 772 according to well-known practices. In block 774, the dual-mode subscriber device 130 accepts the call and responds with a cellular call accept in block 776. In turn, the legacy MSC 140 responds with an ISUP ANM to the media gateway 340 in block 778. The media gateway 340 responds to the soft switch 344 with an IP message with the ANM message information in block 780. In response, the soft switch 344 sends an ISUP ANM to the PSTN 106 in block 782. These PSTN blocks can occur before, after or in parallel with the SIP blocks just described.

The soft switch 344 sends a create connection message to the media gateway 340 in block 784 instructing it to allocate resources for each PCM call leg endpoint. In response to block 782, the PSTN 106 indicates that the POTS call leg has been established in block 786. In block 788, the soft switch 344 sends a modify connection command instructing the media gateway 340 to connect together the two previously allocated PCM voice path endpoints. In block 790, a telephone channel is allocated and a bi-directional audio path from the media gateway 340 through the PSTN 106 to the dual-mode subscriber device 130 is established, such as using the legs 342C, 342D and 342E. In block 792, a bidirectional audio path from the media gateway 340 to the legacy phone 158 is established, thus completing a voice link from the legacy phone 158 to the dual-mode subscriber device 130.

As noted above, a responsive subscriber initiation approach can be used whereby the subscriber device is notified via the VGN 180/WLAN that an incoming call for it has been received at the soft switch and, in response, the subscriber device initiates a call back to the soft switch. In such a case, the correlation process is largely delegated to the soft switch. In a similar fashion, using a responsive soft switch initiation strategy (described below with respect to FIG. 15), the correlation process is largely delegated to the subscriber device.

Figure 15:
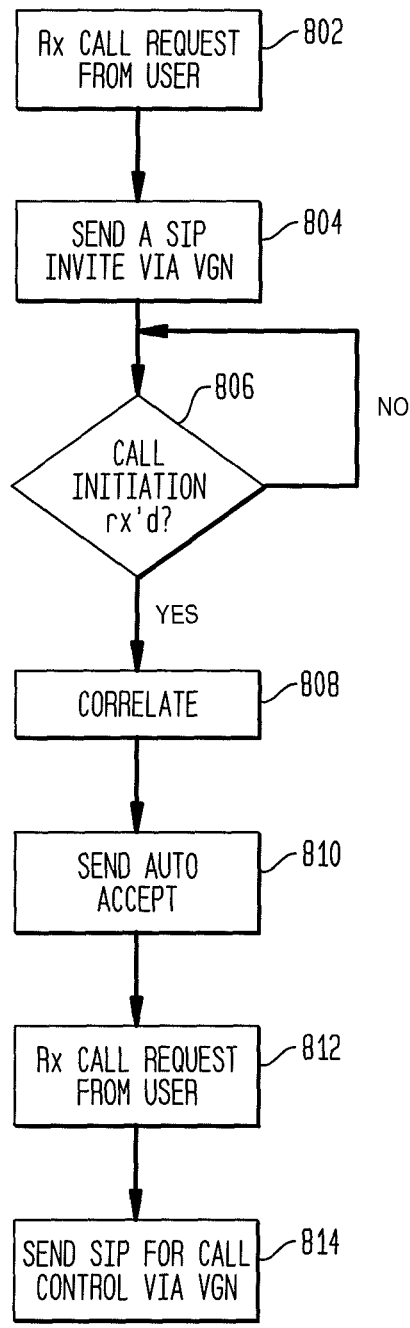
FIG. 15 is a flowchart of the operation of the subscriber device operation in a system embodiment employing a responsive soft switch initiation strategy.

FIG. 15 is a flowchart of the blocks or process implemented by the subscriber device 130 in a system using a responsive soft switch initiation strategy. In a responsive soft switch initiation strategy, when a call is initiated over the cellular network from the dual-mode subscriber device 130, it sends a WLAN-based call initiation message over the WLAN 132 to the VGN 180, which translates and forwards the call initiation message to the soft switch 134 as a SIP invite message. In response, the soft switch 134 may initiate a call to the called party as well as to the dual-mode subscriber device 130. The soft switch 134 then switches the two legs together to complete the voice call using a similar call flow strategy to the ones shown above.

Referring again to FIG. 15, flow begins in block 802 when a call initiation request is received from the user. For example, referring back to FIG. 8, a user can enter a telephone number in the keypad using the user interface 412 of the dual-mode subscriber device (or may alternatively type the telephone number on the keyboard of the VGN 180 itself). Assuming that the keypad on the dual-mode subscriber device is used, in block 804, in response to the request, the controller module 420 commands the VoIP processing module 428 to create a WLAN call initiation message that is sent using the WLAN front end to the VGN 180, which translates and relays the message to the soft switch 134. For example, in response to the WLAN call initiation message, the VGN 180 may create a SIP invite message specifying the called party as well as the dual-mode subscriber device 130 identity and send the message to the soft switch 134.

When the soft switch 134 receives the SIP invite message, it initiates a call to the dual-mode subscriber device 130, such as by sending a PSTN call initiation message to the PSTN indicating the dual-mode subscriber device 130 as the called party by its cellular telephone number. Alternatively, the soft switch 134 can send an IP-encoded message to a media gateway such as the media gateway 340. The soft switch 134 also initiates a call to the actual called party and switches these two call legs together to complete the voice call. Meanwhile the dual-mode subscriber device 130 awaits the cellular call initiation message in block 806.

When the cellular call initiation is received over the cellular front end 402, the cellular processing module 426 alerts the controller module 420. In block 808, the controller module 420 correlates the incoming call with the previously sent invitation. In one embodiment, the soft switch 134 identifies the dual-mode subscriber device 130 as the calling party. For example, the soft switch 134 uses caller ID to specify the originating number as the PBX telephone number assigned to the dual-mode subscriber device 130 and the controller module 420 uses this identity to facilitate the correlation process. If the correlation is successful, the controller module 420 commands the cellular processing module 426 to automatically accept the call in block 810. The controller module 420 need not command the user interface 412 to alert the user, as he is the call initiator. In fact, in most cases, the user is unaware that a responsive soft switch initiation strategy has been used. At this point, the soft switch 134 continues the call flow until a voice call is established between the dual-mode subscriber device 130 and the called party.

As noted above, once the voice call has been established, the dual-mode subscriber device 130 can exercise effective control over the voice call with signaling sent via the VGN 180 to the soft switch 134. For example, in block 812, the controller module 420 receives a request from the user interface 412 to add another caller to the existing call so that a conference call is established. In block 814, the controller module 420 commands the VoIP processing module 428 to create a WLAN message and forward it to the cellular front end 402 for transmission to the VGN 180. The VGN 180 in turn translates the WLAN message into an appropriate SIP message and relays it to soft switch 134.

When a dual-mode subscriber device is in the cellular coverage area only and not in the WLAN coverage area, if a cellular data path (such as the path 150 in FIG. 2) is not available, control messages may be sent between the subscriber device and the associated VGN 180 over voice-bearing paths (such as the path 152 of FIG. 2) using short message services (SMS) that are transmitted over the legacy cellular voice-bearing paths (such as the path 152 of FIG. 2.)

Figure 16:
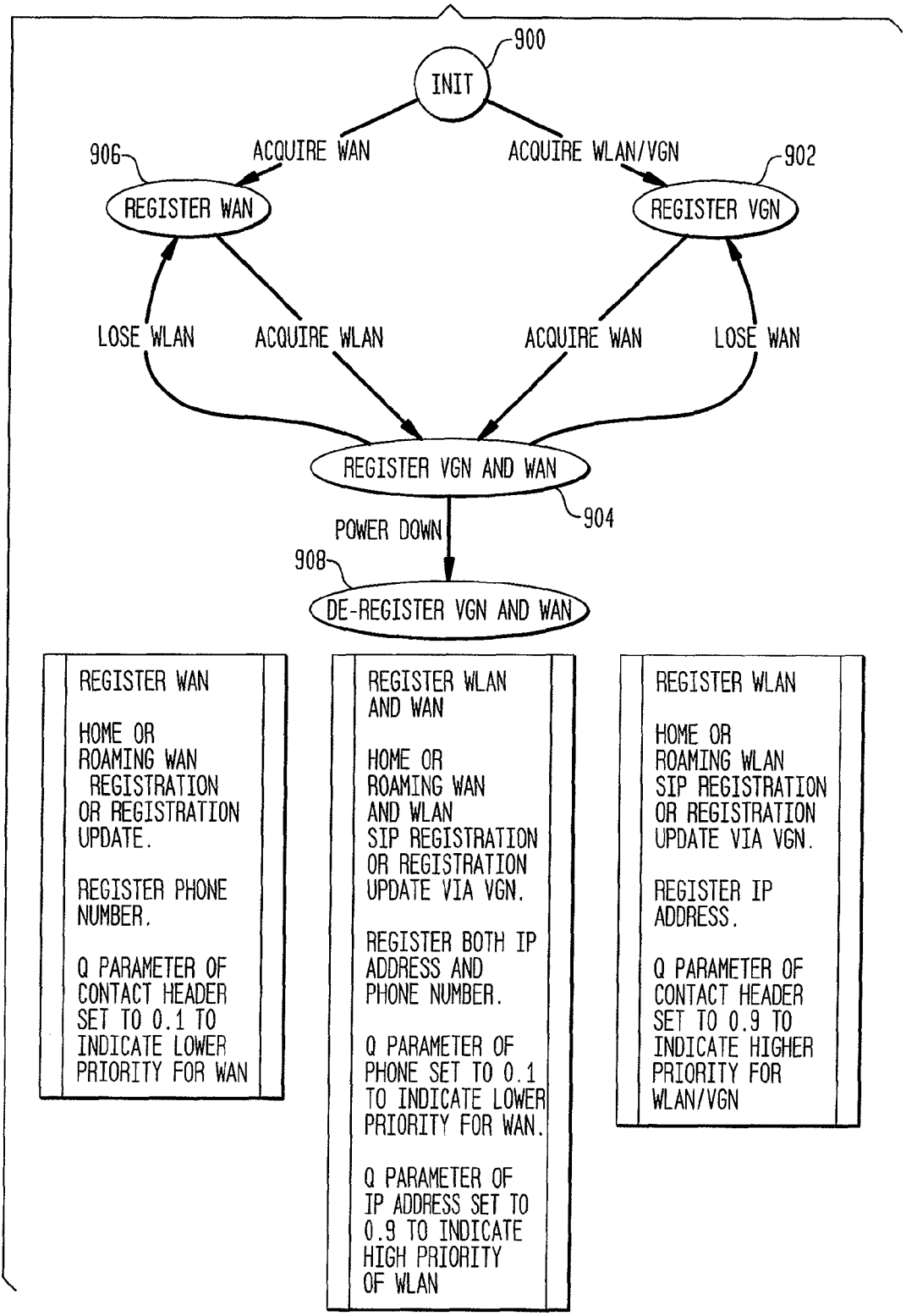
FIG. 16 is a state diagram for idle handoff of a dual-mode subscriber device embodiment.

FIG. 16 is a state diagram illustrating dual-mode subscriber device operation with respect to idle handoff. Idle handoff is the mechanism by which a primary control channel and one mode of operation of the dual-mode subscriber device is determined when the dual-mode subscriber device is in the idle mode (e.g. when no active call is in progress). FIG. 16 is a complement to FIG. 10, which illustrates the registration process.

When the dual-mode subscriber device 130 is turned on, it comes into an initialization state 900. In a preferred embodiment, the dual-mode subscriber device 130 seeks first to acquire a signal from the WLAN, operation over the WLAN being the preferred mode of operation. If the dual-mode subscriber device 130 acquires a WLAN signal, the dual-mode subscriber device 130 transitions to state 902 and registers with the VGN 180 over the WLAN 132 and the VGN 180. The VGN 180, in turn, forwards or creates a registration message for transmission to the soft switch 134 as, for example, a SIP registration or registration update message. In one embodiment, the registration is based on an IP address associated with the VGN 180. The VGN 180 may also transmit additional information to the soft switch 134 regarding the capabilities of the subscriber device. The soft switch 134 may then respond to the VGN 180 with a message indicating a simple registration confirmation, or, alternatively, may likewise transmit additional information to the VGN 180 regarding the authorized features of the subscriber device.

As noted above, in one embodiment, operation over the WLAN is favored over operation in the cellular network. In this case, the registration sent from the VGN 180 to the soft switch 134 specifies a high Q parameter contact header such as 0.9. The Q parameter is an optional mechanism by which priority is established in a standard SIP system. The soft switch may store some other value or parameters to indicate priority.

The dual-mode subscriber device 130 remains in state 902 until it (a) acquires a wide area network such as cellular network 141, (b) is powered down or loses connection to the WLAN and VGN 180, or (c) is docked or requested to deregister. As shown in FIG. 16, if the dual-mode subscriber device detects the cellular network 141, the dual-mode subscriber device 130 transitions to state 904 and registers with the soft switch 134 over the cellular network 141 over the data bearing path using, for example, a cellular-based registration or registration update message. Alternatively, the registration with the cellular network can be sent over the WLAN via the VGN 180.

The dual-mode subscriber device 130 may register by specifying either its cellular phone number or other identifier. If operation over the WLAN is favored, the Q parameter of operation over the cellular system is set below the Q parameter of operation of the WLAN. For example, the Q parameter of operation over the cellular network is set at 0.1. Typically, this registration is in addition to any registration the dual-mode subscriber device makes directly with the cellular network in accordance with normal cellular operation. The registration to the cellular network infrastructure may take place via an overhead channel associated with the voice-bearing path, or via a disassociated control channel.

If the dual-mode subscriber device moves outside the coverage area of the cellular system, it transitions to state 902 and may deregister the cellular registration with the soft switch and the cellular network infrastructure. Such a scenario is likely to occur if the user enters a large building in which WLAN service is provided but cellular service is unable to penetrate.

If the dual-mode subscriber device moves outside the coverage area of the WLAN, in one embodiment it transitions from state 904 to state 906. In this case, it may deregister the WLAN registration over the data-bearing path of the cellular network or it may deregister over the WLAN as it exits. From the initialization state 900, if the dual-mode subscriber device 130 first acquires the cellular network, it transitions to state 906. Although a single connection from state 904 to state 908 is shown on FIG. 16, upon power down from any of states 902, 904 or 906, the dual-mode subscriber device enters state 908 and deregisters both the cellular registration and WLAN registration. These deregistration processes may be executed either over the data-bearing path of the cellular network, the WLAN or combination of these. Once registered, the dual-mode subscriber device may intermittently renew both its cellular network and WLAN registration to keep them fresh in the soft switch.

A dual-mode subscriber may move from within the coverage area of the VGN 180 WLAN to outside the coverage area of the VGN 180 WLAN during an active call. In order to avoid dropping the call, a handoff mechanism is incorporated into the system. In one embodiment of the system, only handoff from the VGN 180 WLAN to the cellular network is provided, and handoff from the cellular network to the VGN 180 WLAN system is not provided. In a preferred embodiment, however, handoff between the VGN 180 WLAN and the cellular network is provided in each direction.

Figure 17:
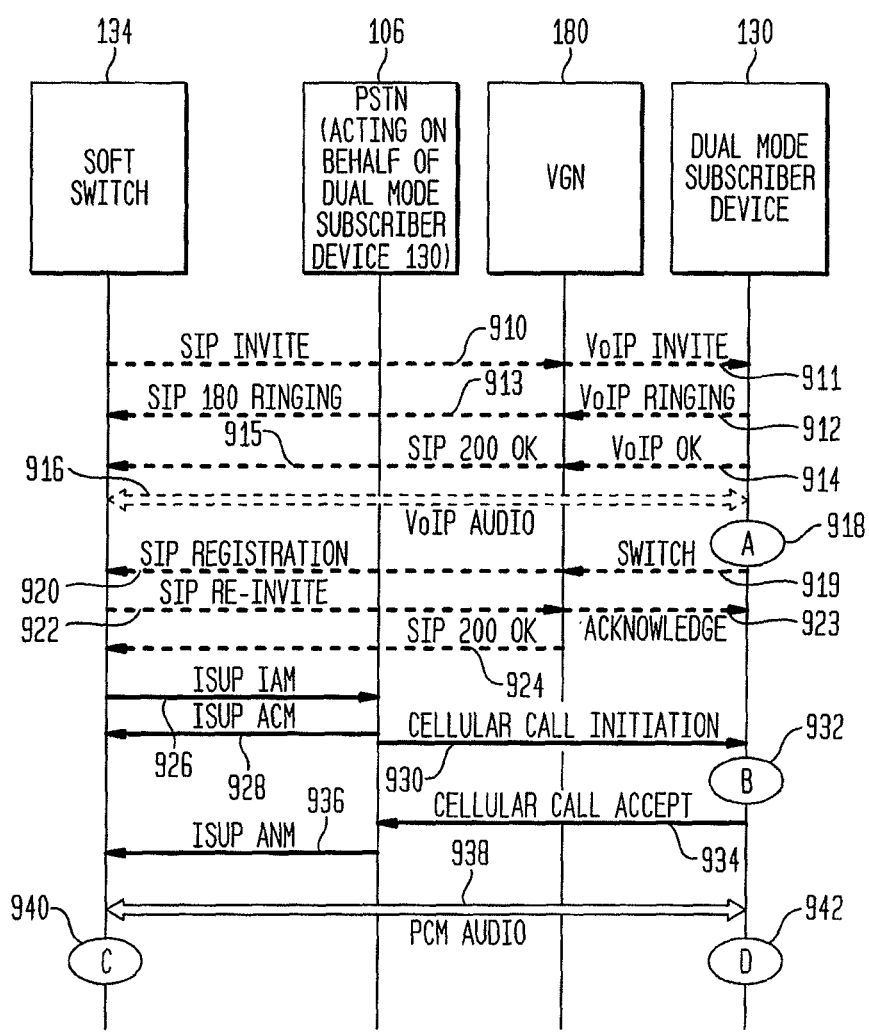
FIG. 17 is a call flow diagram illustrating a handoff embodiment between the WLAN to the cellular network.

FIG. 17 is a call flow diagram showing handoff from the VGN 180 WLAN to the cellular system. Such a handoff could be used as a user exits his hotel room covered by a VGN 180 WLAN. In FIG. 17, for simplicity, the far-end connection is not shown, because no change is made to operation with respect to the far-end user.

In FIG. 17, a voice connection is established with the dual-mode subscriber device 130 over the LAN 132 via the VGN 180. In FIG. 17, dashed arrows denote signaling transmitted over the WLAN. Solid arrows indicated signaling sent over the cellular network.

Via blocks 910-916 of FIG. 17, a call is placed to the dual-mode subscriber device 130, although the handoff mechanism applies equally if the dual-mode subscriber device 130 had established the call. In block 910, the soft switch 134 sends, for example, a SIP invite message to the VGN 180. In block 911, the VGN 180 forwards a WLAN-based invite message to the dual-mode subscriber device 130 over the WLAN 132. In block 912, the subscriber device 130 responds by sending a WLAN-based ringing indication to the VGN 180, which in block 913 the VGN 180 forwards as a SIP 180 Ringing message to the soft switch 134. Assuming that the user accepts the call, in block 914 the dual-mode subscriber device 130 sends a WLAN accept message to the VGN 180, which translates the message to a SIP OK message and forwards it to the soft switch 134 in block 915. In block 916, a bi-directional VoIP audio channel is established between the dual-mode subscriber device 130 and the soft switch 134 over the WLAN 132 via the VGN 180.

In block 918, a determination is made that a handoff to the cellular system is warranted. This determination can be made in one of several ways. In one embodiment, the dual-mode subscriber device 130 itself monitors a WLAN signal strength parameter such as an automatic gain control (AGC) value or received signal strength indication (RSSI). In another embodiment, the dual-mode subscriber device 130 may monitor a packet error rate, signal to noise ratio or other link quality indication. In yet another embodiment, the dual-mode subscriber device 130 may monitor the maximum allowable data rate, current data transfer rate or other link-operation parameter. In yet a further embodiment, the dual-mode subscriber device 130 uses several of these parameters to determine an appropriate handoff trigger.

Alternatively, the soft switch 134 determines the appropriate handoff trigger. For example, the soft switch 134 can monitor performance parameters either directly or by collecting information from the VGN 180. In this case, the soft switch 134 initiates the cellular connection on its own instigation and sends, for example, a re-invite or registration request message via the VGN 180 to notify the dual-mode subscriber device 130 of the handoff.

In yet another alternative embodiment, the VGN 180 monitors handoff triggers and originates handoff request indications to the associated soft switch. The VGN 180 can monitor the same types of parameters as the subscriber device, including signal strength, link quality or link operation parameters.

In any case, in FIG. 17, we assume that, in block 918, the dual-mode subscriber device 130 determines that a handoff to the cellular network is appropriate and sends a switchover message to the VGN 180. In response, the VGN 180 sends the switchover message (e.g., in the form of a SIP registration message) to the soft switch 134 in block 920. The signaling for block 920 is shown in dashed lines to indicate that the signaling is sent over the WLAN 132.

In order to transition the audio stream from the VGN 180/WLAN 132 to the voice-bearing path of the cellular network 141, a PCM audio connection is established over the voice-bearing path of the cellular network 141. The cellular voice connection can be initialized and even fully established before the handoff of the voice-bearing traffic occurs. The WLAN and SIP messaging may occur before, after or at the same time as the initialization of the cellular voice connection.

The choice between these sequencing options may depend upon the architecture of the dual-mode subscriber device 130. Referring again to FIG. 9, the WLAN front end 400 and the cellular front end 402 may share some common elements such as an antenna. If so, the two paths may be coupled together using a switch or a coupler. A switch connects the RF power to either one of the WLAN front end 400 or the cellular front end 402 but may not allow the simultaneous connection of both front-end elements to the antenna. If a coupler, diplexer, duplexer or other power-sharing mechanism is used, simultaneous operation is possible and the system designer has more freedom to order the blocks to the best advantage of voice performance. Unfortunately, the use of a coupler increases the D.C. power requirement and decreases the sensitivity of the subscriber device and a switch may be favored for this reason. In FIG. 17, we assume that the subscriber device is fully capable of simultaneous operation.

In response to the switch-over message in block 920, the soft switch 134 sends an acknowledgement such as a SIP RE-INVITE message in block 922 to the VGN 180, which forwards the acknowledgement to the subscriber device 130 over WLAN 132. The VGN 180 may further respond to the soft switch 134 with further confirmation, such as the SIP 200 OK message in block 924. The signaling for blocks 922 and 924 is shown in dashed lines to indicate that the signaling is sent over the WLAN 132.

The soft switch 134 also sends an ISUP IAM to the PSTN 106 specifying the dual-mode subscriber device 130 by its cellular telephone number in order to establish a voice connection over the voice-bearing path of the cellular network in block 926. In block 928, the PSTN 106 responds with an ACM on behalf of the dual-mode subscriber device 130 and sends a cellular call initiation to the subscriber device 130 in block 930. In block 932, the dual-mode subscriber device 130 automatically accepts the call and correlates the incoming cellular voice call with the on-going WLAN voice call. The dual-mode subscriber device 130 responds with a cellular call accept in block 934. In block 936, the PSTN 106 responds to the cellular call accept with an ISUP ANM. As noted above, these PSTN blocks can occur before, after or in parallel with the SIP-related blocks.

In block 938, a standard voice channel is established from the soft switch 134 to the dual-mode subscriber device 130 over the voice-bearing path of the cellular network 141. If they have not already done so, in blocks 940 and 942, the soft switch 134 and the dual-mode subscriber device 130, respectively, begin transmitting and receiving voice signals over the cellular network 141. In one embodiment, blocks 940 and 942 occur when the soft switch 134 begins receiving PCM frames over the cellular network 141. The soft switch 134 can send a switch indication to the dual-mode subscriber device 130 over the VGN 180 and WLAN 132 or over the cellular network 141. Alternatively, the dual-mode subscriber device 130 can also use the receipt of PCM frames or the cession of VoIP packets to trigger the switch.

As noted above, when the dual-mode subscriber device 130 receives the incoming cellular voice call over the path 152, it correlates the incoming voice call with the on-going WLAN voice call. Several mechanisms can be used to facilitate this correlation. In one embodiment, the soft switch 134 is assigned a set of outgoing numbers according to standard PSTN mechanisms. When the cellular voice call is established from the soft switch 134, one number from the bank of assigned outgoing numbers is assigned to the call and is transmitted over the path 152 according to standard caller ID techniques. The dual-mode subscriber device 130 recognizes the number as one originating from the soft switch 134 and correlates this call with the active WLAN call. In one embodiment, the subscriber device receives information regarding the block of numbers from a SIP signaling message that is transmitted to the VGN 180 and forwarded by the VGN 180 to the subscriber device 134 at the time the call is established. In other embodiments, numbers may be transferred to the dual-mode subscriber device 130 at some earlier time and stored within the dual-mode subscriber device 130.

Depending on the design of the system, this approach may lend itself to misidentification of calls. For example, if two calls are routed from the soft switch in quick succession, the identification of the calls might be transposed at the dual-mode subscriber device. Two solutions to this problem are contemplated. In one embodiment, the soft switch addresses this transposition error by inserting a delay in transmission of one of the two calls. For example, after forwarding a call to the subscriber device, the soft switch will delay the transmission of any subsequent call if necessary so that no two calls are forwarded to the subscriber device within a selected guard band.

In another embodiment, in the carrier-hosted model shown in FIG. 4 or the carrier gateway model shown in FIG. 6, the caller ID (typically carried as tones inserted between the first and second ring tones) can be replaced by a specific identifier. The specific identifier can be used by the subscriber device to precisely correlate the call initiation request with the corresponding active WLAN call. The architectures of FIGS. 4 and 6 specifically lend themselves to the approach in that they avoid transmission over the PSTN and, thus, allow more flexibility in the manipulation of custom operation. For example, typically caller ID information is transmitted between the PSTN and legacy MSC using a field in an ISUP message. Because the ISUP message originates from the media gateway 340 or the carrier soft switch 320, a proprietary caller ID identifier can be inserted. The dual-mode subscriber device 130 correlates this artificial caller ID identifier with an identifier contained in the call initiation message sent to the dual-mode subscriber device in blocks 910 and 911. In this way, the correlation between the legacy cellular voice leg and the SIP messaging that initiated the session can be more precisely identified.

In the example depicted in FIG. 17, the cellular voice call connection was established by the soft switch 134, while the subscriber device acted as a responsive device in accepting the call. Alternatively, a responsive switch transfer strategy could be used to establish the cellular voice call connection. In one embodiment, using a responsive switch transfer strategy, transmission of the ISUP IAM message in block 926 is not necessary. In response to the handoff determination in block 918, the dual-mode subscriber device 130 initiates a call to the soft switch 134 over the voice-bearing path of the cellular network 141. The soft switch 134 uses receipt of an incoming cellular call from the dual-mode subscriber device participating in the active WLAN call as a trigger to initiate a handoff. Thus, the soft switch 134 can switch over the call connection with or without the use of parallel signaling.

Figure 18:
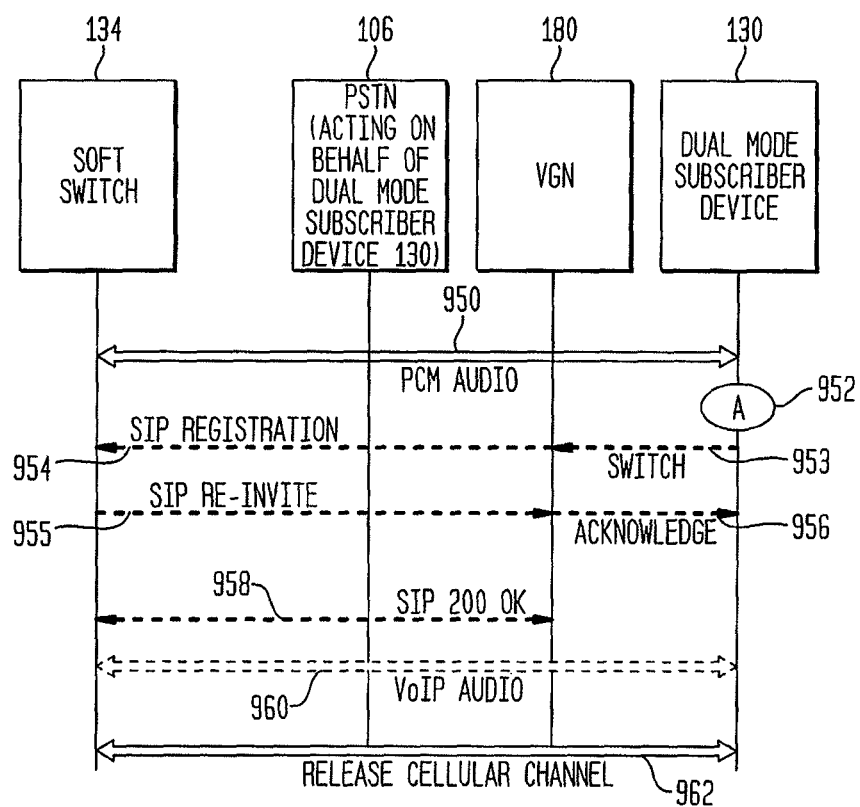
FIG. 18 is a call flow diagram illustrating handoff embodiment from the cellular network to the WLAN.

FIG. 18 is a call flow diagram illustrating handoff from the cellular network to the VGN 180/WLAN. Such a handoff could be used as a user enters his hotel room covered by a WLAN provided, e.g., by his laptop computer acting as a WLAN access point, during a voice call that was established over the voice-bearing path of the cellular network. If the cellular coverage is sufficient within the coverage area of the WLAN, handoff from the cellular system to the WLAN is not strictly necessary, however, but it may be preferable (e.g., to reduce costs associated with operation over the cellular network or to provide an improved quality-of-service level). In FIG. 18, dashed arrows denote signaling transmitted over the WLAN. Solid arrows denote signaling sent over the cellular network. In addition, in FIG. 18, the far-end connection is not shown, because no change is made to operation with respect to the far-end user.

In FIG. 18, a standard cellular voice channel has been established over the voice-bearing path of the cellular network in block 950. Subsequently, the dual-mode subscriber device 130 has entered the coverage area of the VGN 180/WLAN 132. Once the dual-mode subscriber device 130 acquires the WLAN signal, the dual-mode subscriber device 130 can monitor one or more parameters (such as those described above with respect to FIG. 17) to determine when a handoff should occur. These parameters should be chosen to prevent rapid successive handoff between the cellular network and the WLAN. For example, if the dual-mode subscriber device 130 uses transition to the coverage area of an exit-area access point to trigger a handoff to the cellular system, it may wait until it has acquired a non-exit-area access point before instigating a handoff to the WLAN. Alternatively, the dual-mode subscriber device 130 may wait for the triggering parameter to exceed a hysteresis level, which level might be negotiated during registration.

In alternative embodiments, the VGN 180 or the soft switch 134 may make the hand-off determination. Where the VGN 180 determines the appropriate time for a hand-off, it sends a switch-over message (e.g., in the form of a SIP registration message) to the soft switch 134 to notify the soft switch 134 to make the transfer and sends a WLAN transfer instruction to notify the dual-mode subscriber device 130. Alternatively, where the soft switch 134 makes the determination of appropriate time for a handoff, it may send a SIP RE-INVITE or registration request message or the like to notify the VGN 180, which in turn forwards the switchover message to the dual-mode subscriber device 130 over the WLAN.

In this case, we assume in block 952 of FIG. 18, the dual-mode subscriber device 130 determines that a handoff to the VGN 180/WLAN 132 is warranted. In block 953, the dual-mode subscriber device 130 sends a switch-over message to the VGN 180 over the WLAN, which in turn forwards the request to the soft switch 134 (e.g., as a SIP registration message) in block 954. In response, in block 955 the soft switch 134 sends an transfer acknowledgement (e.g., as a SIP RE-INVITE) to the VGN 180, which in turn forwards the transfer acknowledgement to the dual-mode subscriber device 130 over the WLAN in block 956 and may respond in block 958 by sending a transfer-confirmation message (e.g., as a SIP 200 OK) to the soft switch. In response to the SIP OK message or some other negotiated or predefined trigger, both the soft switch 134 and dual-mode subscriber device 130 begin sending audio over the VGN 180/WLAN 132 in block 960. In block 962, both the soft switch 134 and dual-mode subscriber device 130 release the audio path over the voice-bearing path of the cellular network 141.

Figure 19:
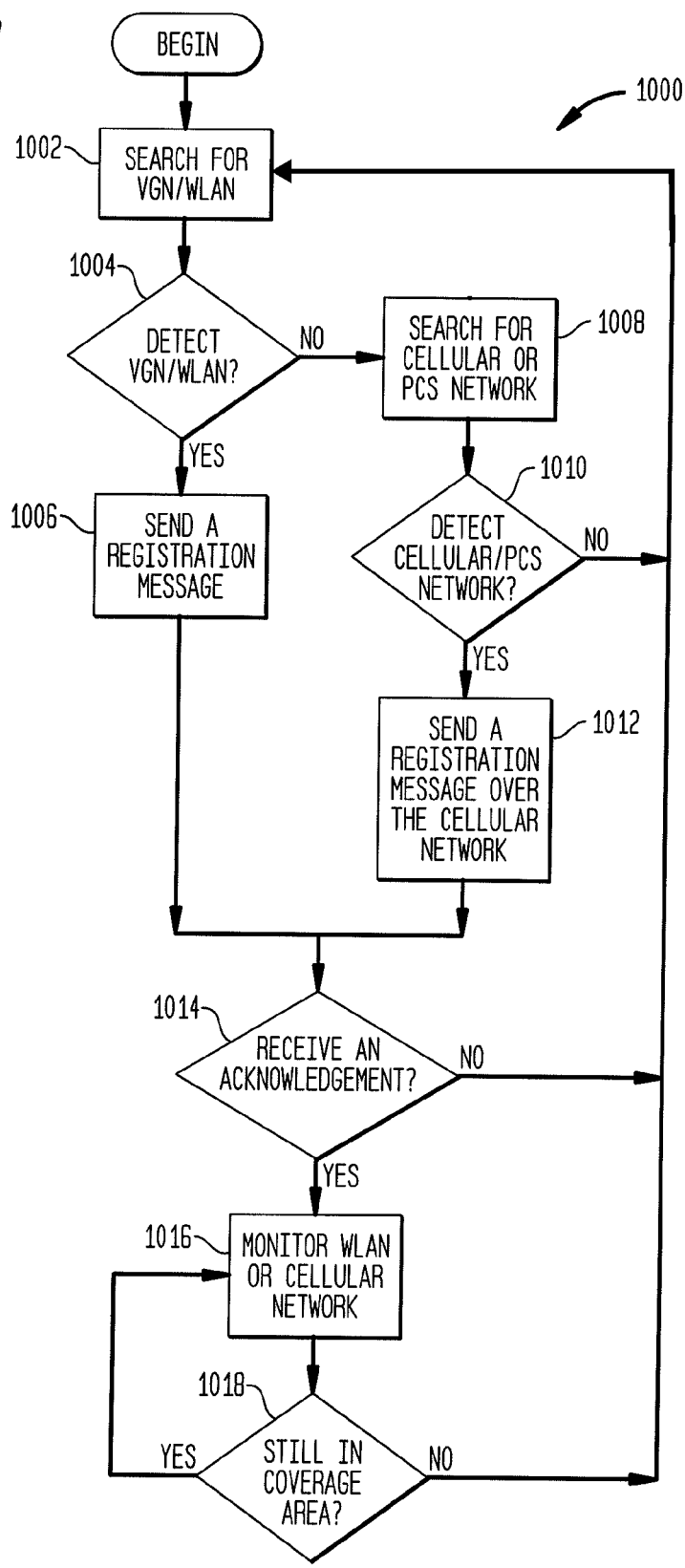
FIG. 19 is a flowchart illustrating a handoff process embodiment between the cellular network and the WLAN.

FIG. 19 is a flowchart of a handoff process 1000, which is a handoff mechanism embodiment to place and/or hand-off a call using a wireless dual-mode subscriber device 130 connected to a VGN 180 in a wireless system 100, constructed and operative in accordance with an embodiment of the present invention. Handoff process 1000 is depicted favoring WLAN access over cellular or Personal Communication System (PCS) networks. It is understood, by those known in the art, that cellular and PCS systems may be used interchangeably in this example embodiment.

At block 1002, the process begins by dual-mode subscriber device 130 searching for a VGN 180/WLAN. If a VGN 180/WLAN is detected at decision block 1004, in block 1006 VoIP processing module 428 sends a registration message over the WLAN to the VGN 180, which forwards the message to soft switch 134, and flow continues at block 1014. At block 1014, dual-mode subscriber device 130 tries to determine whether soft switch 134 received the registration message by responding to the VGN 180 with an acknowledgement message, such as SIP 100 TRYING, indicating that the soft switch 134 is trying to set up the call. If an acknowledgement is not received, flow returns to block 1002. Otherwise, flow continues at block 1016, and dual-mode subscriber device 130 continues to monitor the WLAN connection as the VoIP call progresses.

At block 1018, while the device 130 remains in the VGN 180/WLAN coverage area, it monitors the quality of the network as discussed previously at block 1016. If the quality of the network begins to diminish (e.g., when device 130 is leaving the coverage area, or the signal quality is otherwise reduced), or if the user inputs a selection indicating that the users desires to switch the WLAN call over to the cellular network, dual-mode subscriber device 130 searches for a cellular or PCS network at block 1008. If no networks are detected, flow returns to block 1002.

If a new cellular or PCS network is detected, however, the dual-mode subscriber device 130 may register with the cellular network at block 1012 in several different ways. In one embodiment, cellular processing module 426 initiates a call to soft switch 134 and may also send a registration message to the soft switch 134 or the VGN 180 over the data-bearing path of the cellular network. The soft switch 134 receives the cellular voice call and/or the registration message from the cellular network, realizes that a hand-off is taking place, and drops the existing WLAN connection. In another embodiment, while the VGN 180/WLAN connection is still established, dual-mode subscriber device 130 sends a switch-over message to the VGN 180, which forwards the message (e.g., as a SIP INVITE message) to instruct soft switch 134 to initiate a call to dual-mode subscriber device 130. Soft switch 134 then calls dual-mode subscriber device 130, which answers the call and proceeds to drop the previously existing WLAN connection. In this embodiment, soft switch 134 does not need to know that a hand-off has taken place—it just knows that a new call has been initiated. Flow continues at block 1014.

At block 1014, dual-mode subscriber device 130 tries to determine whether soft switch 134 received the switchover or registration message by responding with an acknowledgement message, such as SIP 100 TRYING, indicating that the soft switch 134 is trying to set up the call. If an acknowledgement is not received, flow returns to block 1002. Otherwise, flow continues at block 1016, and dual-mode subscriber device 130 continues to monitor the cellular network. At block 1018, while the device 130 remains in the cellular network coverage area, it monitors the quality of the network in block 1016 as discussed previously. When the quality of the network diminishes (e.g., when device 130 is leaving the coverage area, or the signal quality is otherwise reduced) or if the user inputs an instruction to switch over, device 130 begins to search for a new WLAN at block 1002.

It should be recognized that the SIP messaging described above may be implemented via the H.323 control signaling protocol, and the messaging may vary from or expand upon the standard SIP or H.323 protocol standards. Modification to standard operation is possible because both the soft switch 134 and the VGN 180 may be designed to provide operation according to the embodiments of the invention and can be design to handle custom messaging. As such, nonstandard messages that are forwarded to a standard SIP or H.323 system could be translated by the soft switch 134. For example, a standard SIP INVITE or RE-INVITE message contains a Session Description Protocol (SDP). SDP is the means by which the dialog to be established using the SIP messaging is described, including the format, timing, and authorship of the streamed media, as well as the capabilities of session participants. As such, in one embodiment of the present invention, the SDP may contain a new set of values that represent the switchover messages exchanged between the VGN 180 and the soft switch 134.

The above description of the disclosed embodiments is provided to enable any person skilled in the art to make or use the invention. Various modifications to these embodiments will be readily apparent to those skilled in the art, and the principles defined herein can be applied to other embodiments without departing from the spirit or scope of the invention. Thus, the invention is not intended to be limited to the embodiments shown herein but is to be accorded the widest scope consistent with the principles and novel features disclosed herein.

While the invention has been described with reference to a preferred embodiment thereof, it will be appreciated by those of ordinary skill in the art that modifications can be made to the structure and elements of the invention without departing from the spirit and scope of the invention as a whole.

What is claimed is:

1. A virtual gateway for communicating voice and call control data between an IP-based telephone switch connected via a communication link and a dual-mode subscriber device connected via a wireless local area network (WLAN) link, comprising:
   a computing device, including
      a wireless local area network interface capable of establishing a WLAN link with the dual-mode subscriber device,
      a network interface capable of establishing a communication link with the IP-based telephone switch, and
      a processor configured to:
         relay voice and call control data between the dual-mode subscriber device and the IP-based telephone switch; and
         create a message in the first call control signaling format initiating a call from the IP-based telephone switch to the dual-mode subscriber device via a wireless communication system,
   wherein:
      the call control data transmitted over the communication link are in first call control signaling format and the call control data transmitted over the WLAN link are in second call control signaling format different than the first call control signaling format; and
      the message initiating the call is a registration message sent to the IP-based telephone switch.

2. The virtual gateway of claim 1, wherein the first call control signaling format is one of session initiation protocol ("SIP") format and H.323 format.

3. The virtual gateway of claim 1, wherein the processor is further configured to translate the call control data received over the communication link to the second call control signaling format for transmission over the WLAN link, and
   wherein the processor is further configured to translate the call control data received over the WLAN link to the first call control signaling format for transmission over the communication link.

4. The method of claim 1, wherein the message initiating the call is a SIP registration message.

5. The virtual gateway of claim 1, wherein the processor is further configured to receive from the dual-mode subscriber device a WLAN-based request to hand off the call from the wireless local area network to a wireless communication system.

6. The virtual gateway of claim 1, wherein the processor is further configured to determine whether a handoff of a call to a wireless communication system is warranted.

7. The virtual gateway of claim 6, wherein the handoff determination is made through monitoring at least one of an automatic gain control value, receive signal strength indication, packet error rate, signal to noise ratio, maximum allowable data rate, and current data transfer rate.

8. The virtual gateway of claim 1, wherein the processor is further configured to transmit a WLAN-based switchover instruction to the dual-mode subscriber device.

9. The virtual gateway of claim 1, wherein the processor is further configured to receive a call confirmation message from the IP-based telephone switch and to relay the call confirmation message to the dual-mode subscriber device.

10. The virtual gateway of claim 9, wherein the call confirmation message from the IP-base telephone switch is a SIP invite message.

11. A method for communicating voice and call control data between an IP-based telephone switch and a dual-mode subscriber device capable of operation within a wireless communication system, comprising the steps of:

establishing a wireless local area network (WLAN) link with the dual-mode subscriber device;

establishing a communication link with the IP-based telephone switch;

relaying voice and call control data between the dual-mode subscriber device and the IP-based telephone switch; and creating a message in the first call control signaling format initiating a call from the IP-based telephone switch to the dual-mode subscriber device via a wireless communication system, wherein:

the call control data transmitted over the communication link are in a first call control signaling format and the call control data transmitted over the WLAN link are in second call control signaling format different than the first call control signaling format; and the message initiating the call is a registration message sent to the IP-based telephone switch.

12. The method of claim 11, wherein the first call control signaling format is one of session initiation protocol ("SIP") format and H.323 format.

13. The method of claim 11, further comprising the steps of:

translating the call control data received over the communication link to the second call control signaling format for transmission over the WLAN link, and translating the call control data received over the WLAN link to the first call control signaling format for transmission over the communication link.

14. The method of claim 11, wherein the message initiating the call is a SIP registration message.

15. The method of claim 14, further comprising the steps of receiving a call confirmation message from the IP-based telephone switch, and relaying the call confirmation message to the dual-mode subscriber device.

16. The method of claim 15, wherein the call confirmation message from the IP-base telephone switch is a SIP invite message.

17. The method of claim 11, further comprising the step of receiving from the dual-mode subscriber device a WLAN-based request to hand off the call from the wireless local area network to a wireless communication system.

18. The method of claim 11, further comprising the step of determining whether a handoff of a call to a wireless communication system is warranted.

19. The method of claim 11, wherein the step of determining includes the step of monitoring at least one of an automatic gain control value, receive signal strength indication, packet error rate, signal to noise ratio, maximum allowable data rate, and current data transfer rate.

20. The method of claim 11, further comprising the step of transmitting a WLAN-based switchover instruction to the dual-mode subscriber device.

* * * * *